(12) United States Patent
Yamaga et al.

(10) Patent No.: US 11,443,767 B2
(45) Date of Patent: Sep. 13, 2022

(54) MAGNETIC RECORDING TAPE HAVING MAGNETIC LAYER INDENTATIONS AND MANUFACTURING METHOD THEREOF, AND MAGNETIC RECORDING TAPE CARTRIDGE

(71) Applicant: Sony Corporation, Tokyo (JP)

(72) Inventors: Minoru Yamaga, Miyagi (JP); Takanobu Iwama, Miyagi (JP); Jun Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/605,469

(22) PCT Filed: Nov. 19, 2018

(86) PCT No.: PCT/JP2018/042736
§ 371 (c)(1),
(2) Date: Oct. 15, 2019

(87) PCT Pub. No.: WO2019/159465
PCT Pub. Date: Aug. 22, 2019

(65) Prior Publication Data
US 2021/0125634 A1    Apr. 29, 2021

(30) Foreign Application Priority Data

Feb. 16, 2018  (JP) .............................. JP2018-026498

(51) Int. Cl.
*G11B 5/73*  (2006.01)
*G11B 5/78*  (2006.01)
(Continued)

(52) U.S. Cl.
CPC ................ *G11B 5/736* (2019.05); *G11B 5/68* (2013.01); *G11B 5/7356* (2019.05);
(Continued)

(58) Field of Classification Search
None
See application file for complete search history.

(56) References Cited

U.S. PATENT DOCUMENTS

| 6,033,759 A | * | 3/2000 | Seki | ..................... G11B 5/7358 |
| | | | | 428/141 |
| 6,207,252 B1 | * | 3/2001 | Shimomura | ............. G11B 5/70 |
| | | | | 428/141 |

(Continued)

FOREIGN PATENT DOCUMENTS

| JP | H06-325349 A | 11/1994 |
| JP | H09-297914 A | 11/1997 |

(Continued)

OTHER PUBLICATIONS

Derwent Abstract of JP 2005-216349 A (Year: 2005).*

(Continued)

*Primary Examiner* — Kevin M Bernatz
(74) *Attorney, Agent, or Firm* — K&L Gates LLP

(57) ABSTRACT

A magnetic recording tape having a plural-layer structure including at least a magnetic layer is provided. The tape has a total thickness of 5.6 μm or smaller, and includes a plurality of indentations disposed in a surface of the magnetic layer. A value obtained by dividing a depth D1 of each indentation with a thickness D2 of the magnetic layer is 15% or greater. The magnetic layer includes a plurality of indentations formed therein, a plurality of the indentations each has a depth of 20% or greater of the thickness of the magnetic layer, and the number of the indentations is 55 or more per 6,400 μm² of a surface area of the magnetic layer.

14 Claims, 8 Drawing Sheets

(51) Int. Cl.
*G11B 5/68* (2006.01)
*G11B 5/735* (2006.01)
*G11B 5/706* (2006.01)

(52) U.S. Cl.
CPC .............. *G11B 5/7358* (2019.05); *G11B 5/78* (2013.01); *G11B 5/70678* (2013.01)

(56) References Cited

U.S. PATENT DOCUMENTS

| | | | | |
|---|---|---|---|---|
| 7,803,471 | B1* | 9/2010 | Ota ...................... | G11B 5/7358 428/845.6 |
| 2003/0017366 | A1* | 1/2003 | Takahashi ................ | G11B 5/78 428/844.3 |
| 2003/0059649 | A1* | 3/2003 | Saliba ...................... | G11B 5/78 428/843 |
| 2004/0131892 | A1 | 7/2004 | Sueki et al. | |
| 2006/0220277 | A1* | 10/2006 | Suzuki ................ | B29C 71/0072 264/345 |
| 2009/0086369 | A1* | 4/2009 | Ishida ...................... | G11B 5/82 360/110 |
| 2010/0246073 | A1* | 9/2010 | Katayama ............ | G11B 5/7085 360/324 |
| 2012/0305692 | A1* | 12/2012 | Suzuki ................ | G11B 23/042 242/334 |
| 2016/0322076 | A1* | 11/2016 | Mori ...................... | G11B 5/7356 |
| 2017/0178676 | A1 | 6/2017 | Kasada | |
| 2019/0027175 | A1* | 1/2019 | Kurokawa ............. | G11B 5/708 |
| 2021/0012800 | A1* | 1/2021 | Yamaga ................ | G11B 5/7358 |

FOREIGN PATENT DOCUMENTS

| | | | |
|---|---|---|---|
| JP | 2001-134919 | A | 5/2001 |
| JP | 2004-213775 | A | 7/2004 |
| JP | 2005216349 | A * | 8/2005 |
| JP | 2006-286148 | A | 10/2006 |
| JP | 2009-087471 | A | 4/2009 |
| JP | 2016-212932 | | 12/2016 |
| JP | 2016-212932 | A | 12/2016 |
| JP | 2017-041293 | A | 2/2017 |
| JP | 2017-111842 | A | 6/2017 |

OTHER PUBLICATIONS

International Search Report and Written Opinion issued in connection with International Patent Application No. PCT/JP2018/042736, dated Jan. 29, 2019. (11 pages).

Japanese Office Action dated Jan. 28, 2020 in corresponding Japanese Application No. 2019-571748.

Japanese Office Action dated Mar. 17, 2020 in corresponding Japanese Application No. 2019-571748.

* cited by examiner (a) (NO TRANSFER)  (b) (TRANSFERRED ONCE)

MAGNETIC RECORDING TAPE HAVING MAGNETIC LAYER INDENTATIONS AND MANUFACTURING METHOD THEREOF, AND MAGNETIC RECORDING TAPE CARTRIDGE

TECHNICAL FIELD

This technology relates to a magnetic recording tape and the like, and more specifically to a magnetic recording tape capable of stably running relative to a magnetic head, a cartridge with the tape accommodated therein, and a manufacturing method of the tape.

BACKGROUND ART

In recent years, owing to the wide spreading of the Internet and cloud computing, and the increasing accumulation and analysis of big data, the amount of information to be stored for long term is explosively increasing. There is, accordingly, an outstanding demand for higher recording capacity on recording media to be used for backing up or archiving a great deal of information as data. Among such recording media, "magnetic recording tapes" (which may be abbreviated as "tapes" in certain instances) have drawn attention again from the viewpoints of cost, energy saving, long life, reliability, capacity, and so on.

Such a magnetic recording tape is contained in a case with an elongated tape, which includes a magnetic layer, being wound on a reel. With a magnetic resistance head (hereinafter the "magnetic head"), recording or reproduction is performed on or from this magnetic recording tape in a direction in which the tape runs. In 2,000, open standards LTO (Linear-Tape-Open) emerged, and its generation update has then progressed to date.

The recording capacity of a magnetic recording tape depends on the surface area (tape length×tape width) of the magnetic recording tape and the recording density per unit area of the tape. The recording density in turn depends on the track density in the tape width direction and the linear recording density (the recording density in the tape length direction). Therefore, the increase in the recording capacity of a magnetic recording tape hangs on how the tape length, track density and linear recording density can be increased. It is to be noted that the tape width can be hardly changed in relation to the standards.

If the track density is made higher, prevention of the off-tracking phenomenon during high-speed running of the magnetic recording tape becomes a more important problem. This off-tracking phenomenon means a phenomenon that no target track exists at a track position where a magnetic head should perform reading or the magnetic head happens to read a wrong track position.

Now, if a tape is made longer for higher recording capacity, the tape thickness becomes thinner. On the other hand, the high-speed running of a tape may advance more and more from now on. Then, the running of the tape during high-speed running may become unstable, whereby the off-tracking phenomenon may tend to occur. Especially when high-speed running of a tape is performed for a long time or is repeated many times, the tape may be deformed due to the occurrence of an excessive distance (spacing) or increased friction between a magnetic head and the running tape. As a consequence, no suitable state of contact of the tape to the magnetic head is available, potentially leading to deteriorating characteristics of the magnetic recording or reproduction from the tape.

To overcome such difficulties, PTL 1 discloses a technology to reduce spacing, which may occur between a magnetic head and a magnetic recording tape, by disposing a lubricant layer on a surface of a magnetic layer, and also a technology to evaluate the thickness of the lubricant layer. PTL 2 discloses a magnetic recording tape, in which the number of projections/the number of particles on a side opposite to a magnetic surface is limited to control the tape interlayer friction. The tape is described to reduce an increase in its dynamic friction coefficient after repeated running compared with its initial dynamic friction coefficient so that meandering of the tape during running can be suppressed.

CITATION LIST

Patent Literature

[PTL 1]
  Japanese Patent Laid-open No. 2017-41293
[PTL 2]
  Japanese Patent Laid-open No. Hei 6-325349

SUMMARY

Technical Problem

This technology reduces the area of contact of a tape to a magnetic head, whereby friction is decreased and spacing is suppressed. As a consequence, this technology has as primary objects thereof the provision of a magnetic recording tape and the like, which allow the tape to stably run at high speed while maintaining a state in which the distance between the magnetic head and the tape is held narrow.

Solution to Problem

As a result of diligent research, the present inventors found for the first time that air existing in an air accumulation space, which can occur between a tape and a magnetic head, causes spacing between the tape and the magnetic head and also acts as a cause for an increase in friction, and with a focus placed on these phenomena, have led to the provision of this technology. Specifically, according to this technology, a tape has a plural-layer structure including at least a magnetic layer, the tape has a total thickness of 5.6 μm or smaller, in other words, a thin tape contrived for higher recording capacity, and includes a plurality of indentations disposed in a surface of the magnetic layer. The present inventors have also successfully specified appropriate ranges with respect to the depths of the indentations in the magnetic layer and the number of such indentations per unit area. This technology is particularly effective if the tape has a magnetic layer that is high in perpendicular orientation and is prone to cause an increase in friction and/or if the tape runs at high speed. This technology also provides a manufacturing method of a magnetic recording tape, which includes a transfer step of, while taking up a magnetic recording tape of a plural-layer structure including at least a magnetic layer and a backing layer, pressing projections, which are formed on a surface of the backing layer, against a surface of the magnetic layer, whereby indentations are formed in the magnetic layer.

Advantageous Effect of Invention

This technology can effectively suppress friction and the spacing phenomenon, which occur between a magnetic recording tape and a magnetic head, so that the tape is allowed to stably run at high speed. The magnetic recording tape according to this technology can prevent or otherwise control an increase in friction to be caused through repeated high-speed running, and therefore can perform recording and reproduction with accuracy by a magnetic head.

DESCRIPTION OF EMBODIMENTS

With reference to the accompanying drawings, a description will be made about preferred embodiments for practicing this technology. It is to be noted that the embodiments to be described hereinafter exemplify the preferred embodiments of this technology and therefore this technology should not be interpreted narrower by the preferred embodiments. The description will be made in the following order.

Figure 1:
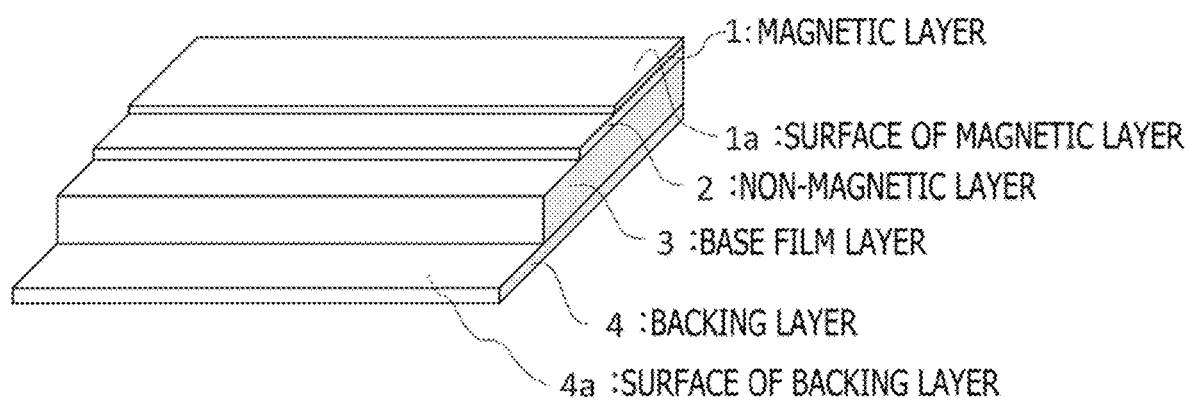
FIG. 1 is a view depicting a basic layer structure of a magnetic recording tape (T) according to this technology.
Figure 2:
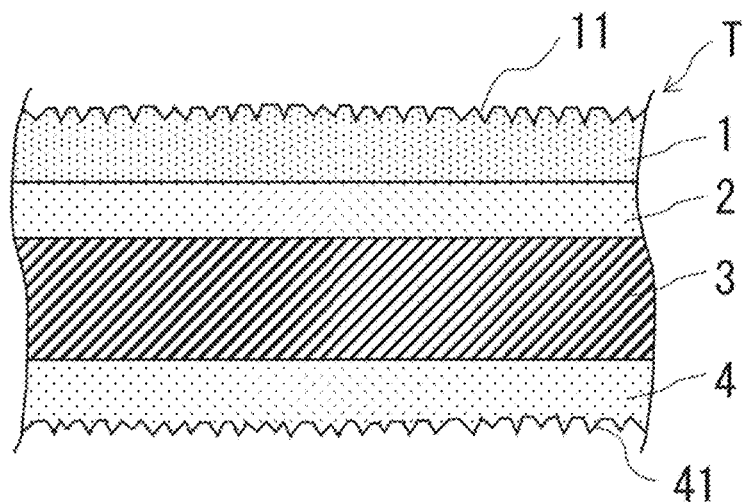
FIG. 2 is a view depicting a cross-sectional layer structure of a cross-section of the magnetic recording tape (T).

(1) About basic layer structure and the like of magnetic recording tape according to this technology
  (2) About configurations and roles of individual layers
  (2-1) Magnetic layer
  (2-2) Non-magnetic layer
  (2-3) Base film layer
  (2-4) Backing layer
(3) About basic manufacturing method of the magnetic recording tape according to this technology
(4) About preferred example of transfer step of forming indentations in surface of magnetic layer (1) About Basic Layer Structure and the Like of Magnetic Recording Tape According to this Technology FIG. 1 is a view depicting a basic layer structure of a magnetic recording tape according to this technology, and FIG. 2 is a view depicting a layer structure of a cross-section of the magnetic recording tape. First, sign T depicted in these FIGS. 1 and 2 indicates the magnetic recording tape (hereinafter called the "tape T").

This tape T has an elongated, tape-shaped form, and upon recording or reproduction, runs in a longitudinal direction. The tape T is configured to enable recording of signals at a minimum recording wavelength of preferably 96 nm or shorter, more preferably 75 nm or shorter, still more preferably 60 nm or shorter, and particularly preferably 50 nm or shorter. Preferably, the tape T is for use in a recording and reproduction apparatus including a ring-type head as a recording head.

This tape T is configured of a magnetic layer 1 having magnetism, a non-magnetic layer 2 located underneath the magnetic layer, a base film layer 3 located underneath the non-magnetic layer 2, and a backing layer 4 as a lowermost layer in this order from the top (from a side to be placed opposite a magnetic head). Therefore, the tape T has a basic layer structure of four layers in total. It is free to incorporate one or more other layers as needed in addition to these 4 layers. The tape T has, as a premise, a total thickness of 5.6 µm or smaller from the viewpoint of higher recording capacity. The total thickness of the tape T is more preferably 5.0 µm or smaller, more preferably 4.8µ or smaller, and particularly preferably 4.6 µm or smaller.

In addition, the tape T according to this technology, for example, has a configuration satisfying a tape speed of 4 msec or higher and servo tracks preferably as many as 5+4n (n: positive integer) in a 5 channel or more, and a configuration that each servo track has a width of 95 µm or smaller, a bit length of 48 nm or smaller, and a track width of 3.0µ or smaller. In other words, the tape T according to this technology may be used for recording or reproduction at a tape speed of 4 msec or higher.

The upper limit of the average thickness (average total thickness) of the tape T is preferably 5.6 µm or smaller, more preferably 5.0 µm or smaller, and still more preferably 4.4 µm or smaller. If the tape T has an average thickness $t_T$ of 5.6 µm or smaller, the storage capacity to which recording is possible in a single data cartridge can be increased than those of general magnetic recording tapes. The lower limit of the average thickness of the tape T is, for example, 3.5 µm or greater although no particular limitation is imposed thereon.

The average thickness of the tape T is determined by procedures to be described subsequently in a method for the determination of the average thickness of the backing layer 4. As a coercive force Hc, the upper limit of the coercive force Hc of the tape T in its longitudinal direction is preferably 2,000 Oe or lower, more preferably 1,900 Oe or lower, and more preferably 1,800 Oe or lower.

If the lower limit of the coercive force Hc measured in the longitudinal direction of the tape T is preferably 1,000 Oe or higher, it is possible to suppress demagnetization that occurs by a leakage magnetic flux from the recording head. This coercive force Hc is determined as will be described hereinafter.

First, a measurement sample is cut from the elongated tape T, and the M-H loop of the entire measurement sample is measured in the longitudinal direction of the measurement sample (the running direction of the tape T) by a vibrating sample magnetometer (VSM). Next, the coating films (the non-magnetic layer 2, magnetic layer 1, backing layer 4 and the like) are completely removed with acetone, ethanol or the like to leave the base film layer 3 alone. Using the base film layer 3 as a sample for background correction, the M-H loop of the base film layer 3 is measured by the VSM in the longitudinal direction of the base film layer 3 (the running direction of the tape T). Subsequently, the M-H loop of the base film layer 3 is subtracted from the M-H loop of the entire measurement sample to obtain a background-corrected M-H loop. From the M-H loop so obtained, the coercive force Hc is determined. It is to be noted that the M-H loop measurements shall be both conducted at 25° C. Further, no "demagnetization correction" shall be conducted upon measurement of the M-H loop in the longitudinal direction of the tape T.

About Squareness Ratio

The squareness ratio (also called the "orientation") S1 of the tape T in the perpendicular direction (thickness direction) thereof is 65% or higher, preferably 70% or higher, and more preferably 75% or higher. If the squareness ratio S1 in the perpendicular direction (hereinafter also called the "perpendicular orientation") is 65% or higher, the magnetic powder is provided with a sufficiently high squareness ratio so that a still better SNR can be obtained.

The squareness ratio S1 in the perpendicular direction is determined as will be described hereinafter. A measurement sample is cut from the elongated tape T, and the M-H loop of the entire measurement sample is measured by the VSM in the perpendicular direction (thickness direction) of the tape T. Next, the coating films (the non-magnetic layer 2, magnetic layer 1, backing layer 4 and the like) are completely removed with acetone, ethanol or the like to leave the base film layer 3 alone. Using the base film layer 3 as a sample for background correction, the M-H loop of the base film layer 3 is measured by the VSM in the perpendicular direction of the base film layer 3 (the perpendicular direction of the tape T). Subsequently, the M-H loop of the base film layer 3 is subtracted from the M-H loop of the entire measurement sample to obtain a background-corrected M-H loop. By introducing the saturation magnetization Ms (emu) and residual magnetization Mr (emu) of the resulting M-H loop into the following formula, the squareness ratio S1(%) in the perpendicular direction is calculated. It is to be noted that the M-H loop measurements shall be both conducted at 25° C. Further, no "demagnetization correction" shall be conducted upon measurement of the M-H loop in the perpendicular direction of the tape T.

Squareness ratio $S1(\%)$ in the perpendicular direction $= (Mr/Ms) \times 100$

The squareness ratio S2 of the tape T in the longitudinal direction (running direction) thereof is preferably 35% or lower, more preferably 30% or lower, and still more preferably 25% or lower. If the squareness ratio S2 is 35% or lower, the magnetic powder is provided with a sufficiently high squareness ratio in the perpendicular direction so that a still better SNR can be obtained. The squareness ratio S2 is measured like the squareness ratio S1 in the perpendicular direction except that the measurement of the M-H loop of the entire measurement sample and the measurement of the M-H loop of the base film 3 are conducted in the longitudinal directions (running direction) of the tape T and base film layer 3.

According to a preferred embodiment of this technology, the ratio of the squareness ratio of the magnetic layer in the perpendicular direction thereof to the squareness ratio of the magnetic layer in the longitudinal direction is preferably 1.8 or greater, more preferably 2 or greater, and still more preferably 2.05 or greater. A ratio equal to or greater than this value is preferred from the viewpoint of the recording and reproduction characteristics.

(2) About Configurations and Roles of Individual Layers (Magnetic Layer, Non-Magnetic Layer, Base Film Layer, and Backing Layer)

(2-1) Magnetic Layer

In the tape T having such a basic layer configuration as described above, the magnetic layer 1 which exists as an outermost surface layer functions as a signal recording layer. In recent years, it has become an important problem to increase the information recording capacity for the tape T. Accordingly, it is required to increase the recording area (recording capacity), for example, by making the tape T thinner and increasing the tape length per cartridge.

The magnetic layer 1 is a longitudinal recording layer or perpendicular recording layer, and includes, for example, a magnetic powder, a binder and a lubricant. The magnetic layer 1 may further include additives such as conductive particles, an abrasive and an anti-rust agent as needed. The magnetic layer 1 may be provided with a number of pores (not depicted) to store the lubricant therein. These numerous pores may preferably be disposed extending in a direction perpendicular to the surface of the magnetic layer 1.

Here, the thickness of the magnetic layer 1 is preferably in a range of 20 to 100 nm. The lower limit thickness of 20 nm is a minimum thickness from the viewpoint of conducting uniform and stable coating of the magnetic layer 1, and a thickness greater than the upper limit thickness of 100 nm is detrimental from the viewpoint of setting a bit length for a tape of high recording density.

The magnetic layer 1 may preferably have plural servo bands SB and plural data bands DB beforehand. The plural servo bands SB are arranged at equal intervals in the width direction of the tape T. Between the adjacent servo bands SB, the data bands DB are arranged, respectively. In the servo bands SB, servo signals are written beforehand to perform tracking control of the magnetic head. In the data bands DB, user data are recorded. The number of the servo bands SB is preferably 5 or more, and more preferably 5+4n (where n is a positive integer) or more. If the number of the servo bands SB is 5 or more, effects on the servo signals due to dimensional variations in the width direction of the tape T can be suppressed, so that stable recording and reproduction characteristics with reduced off-tracking can be ensured.

The average thickness of the magnetic layer 1 can be determined as will be described hereinafter. First, the tape T is machined thin perpendicularly to principal surfaces thereof to prepare a test piece, and the test piece is observed on a cross-section thereof by a transmission electron microscope (TEM). System and observation conditions will hereinafter be described.

System: TEM (H9000NAR manufactured by Hitachi, Ltd.)

Accelerating voltage: 300 kV

Magnification: 100,000 times

Next, using the resulting TEM image, the thickness of the magnetic layer 1 is measured at least 10 points or more in the longitudinal direction of the tape T, and the measurement values are simply averaged (subjected to arithmetic mean) to determine the average thickness of the magnetic layer 1. It is to be noted that the measurement points shall be chosen at random from the test piece.

This magnetic layer 1 is formed as a layer with at least a magnetic powder (magnetic particles in a powder form)

added therein. On this magnetic layer 1, recording of signals is performed by changing its magnetism under a magnetic field according to a known in-plane magnetic recording method or a known perpendicular magnetic recording method. In the former in-plane magnetic recording method, signals are recorded, in a direction longitudinal to the tape, in the magnetic layer 1 added, for example, with a magnetic metal powder that exhibits magnetization function. In the latter perpendicular magnetic recording method, magnetic recording is performed, in a direction perpendicular to the tape 1, to the magnetic layer 1 added, for example, with a BaFe (barium ferrite) magnetic powder or the like that exhibits magnetization function. Whichever the method is used, the recording of signals is performed by magnetization of the magnetic particles in the magnetic layer 1 under a magnetic field applied from the magnetic head H.

Examples of the magnetic particles, which make up the magnetic powder in the magnetic layer 1, include gamma hematite, magnetite, chromium dioxide, cobalt-coated iron oxide, hexagonal ferrite, barium ferrite (BaFe), Co ferrite, strontium ferrite, metal (metal), epsilon iron oxide (ε-iron oxide), and the like, and no particular limitation is imposed thereon. It is to be note that ε-iron oxide may contain any one of Ga or Al. These magnetic particles are freely selected on the basis of the manufacturing method of the magnetic layer 1, the tape standards and functions, and so on.

The shape of the magnetic particles relies on their crystalline structure. For example, BaFe is hexagonal platelet, ε-iron oxide is spherical, cobalt ferrite is cubic, and metal is spindle-shaped. In the magnetic layer 1, these magnetic particles are oriented in the manufacturing process of the tape T. It is to be noted that BaFe is also usable as a suitable magnetic material in this technology because of its high data recording reliability such as a little decline in coercive force even in a high-temperature and high-moisture environment.

The magnetic powder contains, for example, a powder of nanoparticles containing ε-iron oxide (hereinafter called "ε-iron oxide particles"). ε-Iron oxide particles can provide a high coercive force even as fine particles. Preferably, ε-iron oxide contained in ε-iron oxide particles may preferentially crystallize and orient in the thickness direction (perpendicular direction) of the tape T.

ε-Iron oxide particles have a spherical or substantially spherical shape, or have a cubic or substantially cubic shape. As ε-iron oxide particles have a shape as described above, the use of ε-iron oxide particles as magnetic particles, compared with the use of hexagonal platelet barium ferrite particles as magnetic particles, can reduce the area of contact between the particles themselves in the thickness direction of the tape T and can hence suppress aggregation of the particles themselves. It is, accordingly, possible to increase the dispersibility of the magnetic powder and to obtain a still better SNR (Signal-to-Noise Ratio).

ε-Iron oxide particles have a core-shell type structure. Specifically, ε-iron oxide particles each include a core portion and a shell portion disposed around the core portion and having a two-layer structure. The shell portion of the two-layer structure includes a first shell portion disposed on the core portion, and a second shell portion disposed on the first shell portion. The core portion contains ε-iron oxide. The ε-iron oxide contained in the core portion is preferably one containing ε-$Fe_2O_3$ crystals as a main phase, with one including ε-$Fe_2O_3$ as a single layer being more preferred.

The first shell portion covers at least a part of the circumference of the core portion. Specifically, the first shell portion may partially cover the circumference of the core portion, or may cover the entire circumference of the core portion. From the viewpoints of providing sufficient exchange coupling with the core portion and improving the magnetic characteristics, the first shell portion preferably covers the entire surface of the core portion.

The first shell portion is a so-called soft magnetic layer, and contains a soft magnetic material such as, for example, α-Fe, a Ni—Fe alloy or an Fe—Si—Al alloy. α-Fe may be one available from reduction of ε-iron oxide contained in the core portion 21. The second shell portion is an oxide film as an anti-oxidation layer. The second shell portion contains α-iron oxide, aluminum oxide or silicon oxide. α-Iron oxide contains at least one iron oxide, for example, of $Fe_3O_4$, $Fe_2O_3$ and FeO. If the first shell portion contains α-Fe (soft magnetic material), the α-iron oxide may be one available from oxidation of α-Fe contained in the first shell portion.

Owing to the inclusion of the first shell portions in the ε-iron oxide particles as mentioned above, the coercive force of the entire ε-iron oxide particles (core-shell particles) can be adjusted to a level suited for recording while maintaining the coercive force of the core portions alone at a large value to ensure thermal stability. As the ε-iron oxide particles have the second shell portions as mentioned above, the ε-iron oxide particles are exposed in air to result in the occurrence of rust or the like on the surfaces of the particles during and before the manufacturing process of the magnetic tape T, so that the characteristics of the ε-iron oxide particles can be suppressed from being reduced. It is, accordingly, possible to suppress a deterioration in the characteristics of the tape T.

The description has been made about the case that the ε-iron oxide particles each have the shell portion of the two-layer structure, but the ε-iron oxide particles may each have a shell portion of a single-layer structure. In this case, the shell portion has a similar structure as the first shell portion. From the viewpoint of suppressing a deterioration in the characteristics of ε-iron oxide particles, however, the ε-iron oxide particles may each preferably have a shell portion of a two-layer structure as in the above-mentioned first embodiment.

In the foregoing, the description has been made about the case that ε-iron oxide particles each have the core-shell structure, but ε-iron oxide particles may contain an additive in place of the core-shell structure or may contain an additive in addition to the core-shell structure. In this case, portions of Fe in ε-iron oxide particles are substituted with the additive. The inclusion of the additive in ε-iron oxide particles can also adjust the coercive force Hc of the whole ε-iron oxide particles to a coercive force Hc suited for recording, and therefore can improve the recording readiness. The additive is a metal element other than iron, preferably a trivalent metal element, more preferably at least one of Al, Ga or In, and still more preferably at least one of Al or Ga.

Specifically, ε-iron oxide with an additive contained therein includes ε-$Fe_{2-x}M_xO_3$ crystals in which M is a metal element other than iron, preferably a trivalent metal element, more preferably at least one of Al, Ga or In, and still more preferably at least one of Al or Ga, and x satisfies, for example, $0<x<1$.

As the magnetic powder, a powder of nanoparticles containing hexagonal ferrite (hereinafter called "hexagonal ferrite particles") may be used. Hexagonal ferrite particles have, for example, a hexagonal platelet shape or a substantially hexagonal platelet shape. Hexagonal ferrite particles contain preferably at least one of Ba, Sr, Pb or Ca, and more preferably at least one of Ba or Sr. Specifically, hexagonal ferrite particles may be, for example, barium ferrite or strontium ferrite. Barium ferrite may further contain at least one of Sr, Pb or Ca in addition to Ba. Strontium ferrite may further contain at least one of Ba, Pb or Ca in addition to Sr.

More specifically, hexagonal ferrite has an average composition represented by the general formula $MFe_{12}O_{19}$. In the formula, M is, for example, at least one metal among Ba, Sr, Pb and Ca, and preferably at least one metal among Ba and Sr. M may also be a combination of Ba and one or more metals selected from the group consisting of Sr, Pb and Ca. As a further alternative, M may also be a combination of Sr and at least one metal selected from the group consisting of Ba, Pb and Ca. In the above-described general formula, a portion of Fe may be substituted with another metal element.

If the magnetic powder contains a powder of hexagonal ferrite particles, the average particle size of the magnetic powder is preferably 50 nm or smaller, more preferably 10 nm or greater but 40 nm or smaller, and still more preferably 15 nm or greater but 30 nm or smaller. If the magnetic powder contains the powder of hexagonal ferrite particles, the average aspect ratio of the magnetic powder is similar to that in the above-mentioned embodiment.

The average particle size and average aspect ratio of the magnetic powder are determined as will be described hereinafter.

First, the tape T as a measurement object is machined by an FIB (Focused Ion Beam) method or the like to prepare a slice, and the slice is observed on a cross-section thereof by TEM. From the resulting TEM picture, 50 magnetic powder particles are chosen at random, and each particle is measured for its major-axis length DL. The term "major-axis length DL" as used herein means the maximum one among the distances between two parallel lines drawn at all angles, respectively, so that the lines extend in contact with the contour of the particle (the so-called maximum Feret diameter). Subsequently, the measured DLs of the 50 particles are simply averaged (subjected to arithmetic mean) to determine the average major-axis length DLave. The average major-axis length DLave determined as described above is used as the average particle size of the magnetic powder. On the other hand, the minimum distance is measured similarly, and is used as a minor-axis length. The minor-axis lengths DSs of the 50 particles are simply averaged (subjected to arithmetic mean) to determine the average minor-axis length DSave. From the average major-axis length DLave and the average minor-axis length DSave, the average aspect ratio (DLave/DSave) of the magnetic powder is then determined.

If particles are platelet, the plate thickness is represented by DS, 50 particles which are not exposed at plate surfaces thereof in a measurement direction are chosen at random as in the foregoing, the minimum minor-axis is represented by DSave, and the average volume is determined by the following formula.

Average volume=$3\sqrt{3}/8 \times DLave \times DLave \times DSave$

If particles are spherical, the DLs of 50 particles are determined, and the average volume is determined by the following formula.

Average volume=$\pi/6 \times DLave^3$

If particles are cubes, the lengths DLs of the sides of 50 particles are determined, and the average volume is determined by the following formula.

Average volume=$DLave^3$

As the magnetic powder, a powder of nanoparticles containing Co-containing spinel ferrite (hereinafter called "cobalt ferrite particles") may also be used. Preferably, cobalt ferrite particles have uniaxial anisotropy. Cobalt ferrite particles have, for example, a cubic shape or a substantially cubic shape. Co-containing spinel ferrite may further contain at least one of Ni, Mn, Al, Cu or Zn in addition to Co.

Co-containing spinel ferrite have an average composition represented, for example, by the following formula (1).

$$Co_xM_yFe_2O_z \qquad (1)$$

(in which M is at least one metal, for example, among Ni, Mn, Al, Cu and Zn, x is a value in a range of $0.4 \leq x \leq 1.0$, and y is a value in a range of $0 \leq y \leq 70.3$, with a proviso that x and y satisfy a relationship of $(x+y) \leq 1.0$, and z is a value in a range of $3 \leq z \leq 4$, and a portion of Fe may be substituted with another metal element.)

If the magnetic powder contains a powder of cobalt ferrite particles, the average particle size of the magnetic powder is preferably 25 nm or smaller, and more preferably 23 nm or smaller. If the magnetic powder contains the powder of cobalt ferrite particles, the average aspect ratio of the magnetic powder is similar to that in the above-mentioned embodiment. Further, the average aspect ratio of the magnetic powder is also determined as in the foregoing.

The average particle size (average maximum particle size) of the magnetic powder is preferably 22 nm or smaller, more preferably 8 nm or greater but 22 nm or smaller, and still more preferably 12 nm or greater but 22 nm or smaller. The average aspect ratio of the magnetic powder is preferably 1 or greater but 2.5 or smaller, more preferably 1 or greater but 2.1 or smaller, and still more preferably 1 or greater but 1.8 or smaller. An aspect ratio of the magnetic powder in a range of 1 or greater but 2.5 or smaller can suppress aggregation of the magnetic powder and can also suppress resistance to be applied to the magnetic powder upon perpendicularly orienting the magnetic powder in a step of forming the magnetic layer 1. It is, accordingly, possible to improve the perpendicular orientation of the magnetic powder.

In this magnetic layer 1, non-magnetic additives are generally contained to enhance the strength and durability of the magnetic layer 1. For example, a binder, a dispersant, an abrasive and the like are mixed as needed in the magnetic layer 1. This magnetic layer 1 is formed by providing a magnetic coating formulation, in which the magnetic powder and selected ones of these additives are added, and applying the magnetic coating formulation to an underlying layer.

As the binder to be added in the magnetic layer 1, preferred is a resin of a structure in which crosslinking reactions have been imparted to a polyurethane resin, vinyl chloride resin, or the like. However, the binder is not limited to such resins, and other resins may also be added as appropriate depending on the physical properties required for the tape T. In general, no particular limitation is imposed on the resin or resins to be added insofar as they are commonly used in coating-type tapes T.

Examples include polyvinyl chloride, polyvinyl acetate, vinyl chloride-vinyl acetate copolymer, vinyl chloride-vinylidene chloride copolymer, vinyl chloride-acrylonitrile copolymer, acrylate-acrylonitrile copolymers, acrylate-vinyl chloride-vinylidene chloride copolymers, vinyl chloride-acrylonitrile copolymer, acrylate-acrylonitrile copolymers, acrylate-vinylidene chloride copolymers, methacrylate-vinylidene chloride copolymers, methacrylate-vinyl chloride copolymers, methacrylate-ethylene copolymers, polyvinyl fluoride, vinylidene chloride-acrylonitrile copolymer, acrylonitrile-butadiene copolymer, polyamide resins, polyvinyl butyral, cellulose derivatives (cellulose acetate butyrate, cellulose diacetate, cellulose triacetate, cellulose propionate, nitrocellulose), styrenebutadiene copolymer, polyester resins, amino resins, synthetic rubbers, and so on. In addition, examples of thermosetting resins or reactive resins include phenol resins, epoxy resins, urea resins, melamine resins, alkyd resins, silicone resins, polyamine resins, urea formaldehyde resins, and so on.

In each binder mentioned above, polar functional groups such as —$SO_3M$, —$OSO_3M$, —COOM or P=O(OM)$_2$ may also be introduced in order to increase the dispersibility of the magnetic powder. In these formulas, M is a hydrogen atom, or an alkali metal such as lithium, potassium or sodium. Further polar functional groups include those of the side chain type, which have end groups of —NR1R2 or —NR1R2R3$^+$X$^-$, and those of the main chain type of >NR1NR2$^+$X$^-$. In these formulas, R1, R2 and R3 are each a hydrogen atom or hydrocarbon group, and X$^-$ is an ion of a halogen element ion such as fluorine, chlorine, bromine, or iodine, or an inorganic or organic ion. Still further polar functional groups include —OH, —SH, —CN, epoxy, and like groups.

The lubricant for the magnetic layer 1 preferably contains a compound represented by the following general formula (1) and a compound represented by the following general formula (2). The inclusion of these compounds in the lubricant can notably reduce the dynamic friction coefficient of the surface of the magnetic layer 1, and therefore can further improve the running performance of the tape T.

$$CH_3(CH_2)_nCOOH \quad (1)$$

(in the general formula (1), n is an integer selected from a range of 14 and greater but 22 or smaller.)

$$CH_3(CH_2)_pCOO(CH_2)_qCH_3 \quad (2)$$

(in the general formula (2), p is an integer selected from a range of 14 and greater but 22 or smaller, and q is an integer selected from a range of 2 and greater but 5 or smaller.)

As a still further additive, the magnetic layer 1 may also contain, as non-magnetic reinforcing particles, aluminum oxide (α-, β- or γ-alumina), chromium oxide, silicon oxide, diamond, garnet, emery, boron nitride, titanium carbide, silicon carbide, titanium carbide, titanium oxide (rutile or anatase titanium oxide), or the like.

In this technology, a finely indented nano-order structure is formed in the surface 1a of the magnetic layer 1. Specifically, this technology features, as one of its characteristic features, that indentations, each of which has a predetermined depth or deeper, are positively or intentionally disposed to include a predetermined number or more of such indentations per unit area. These indentations 11 have a size that enables to clearly distinguish the finely indented structure from a more extremely fine rough surface structure naturally formed on the surface of the magnetic layer 1 due to its composition and/or materials.

Concerning this technology, there is disclosed herein an example in which the magnetic layer 1 is formed by coating application (coating). It is, however, to be noted that the indentations 11 may also be formed in the surface of the magnetic layer 1 even if the magnetic layer 1 is formed by a vacuum film deposition method such as vapor deposition or another formation method.

Figure 3:
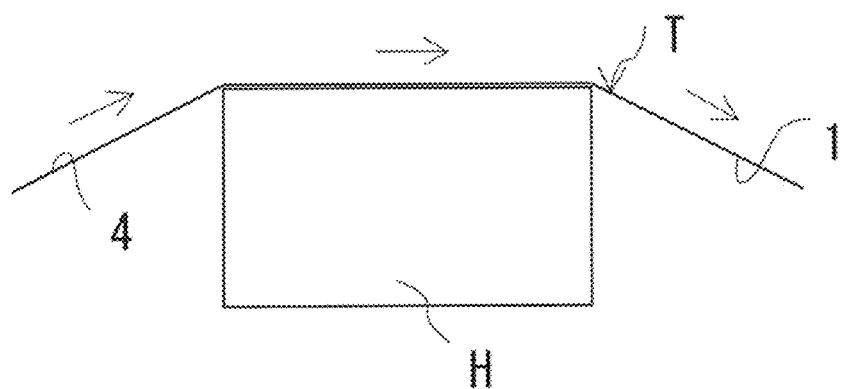
FIG. 3 is a view illustrating a state in which a general magnetic recording tape (T) is ideally traveling on a magnetic head (H).
Figure 4:
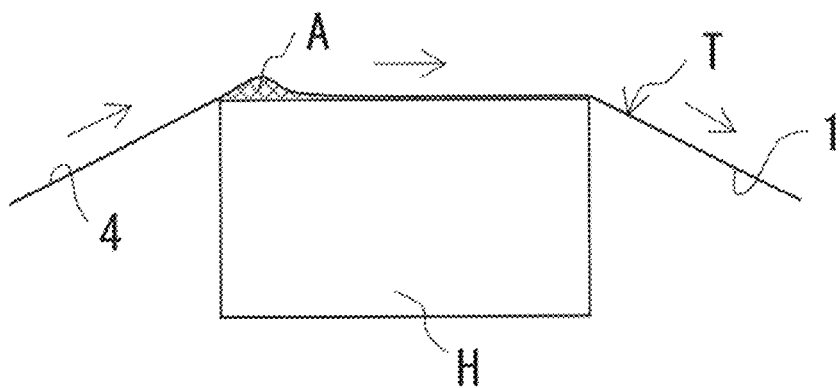
FIG. 4 is a schematic view for describing a difficulty (problem) that arises when a conventional general magnetic recording tape runs on the magnetic head (H).

Referring now to FIGS. 3 and 4, a description will be made about reasons and purposes for the formation of the indentations 11 in the magnetic layer 1. FIG. 3 is a view illustrating a state in which a general magnetic recording tape is ideally running on a magnetic head. FIG. 4 is a schematic view for describing a difficulty (problem) that arises when the general magnetic recording tape runs on the magnetic head.

First, as illustrated in FIG. 3, a magnetic layer 1 located as an uppermost layer of the tape T is a layer which opposes the magnetic head H arranged in a magnetic recording apparatus (not illustrated). Under the magnetic field from the magnetic head H, the magnetism of the magnetic layer 1 is changed to perform recording of signals, and on the other hand, the magnetic head H reads the changes in magnetism to perform reproduction of the recorded signals. It is to be noted that the kind of the magnetic head H shall not be limited particularly narrow in this technology.

Ideal running of the tape T means that, even when running repeatedly, the tape T stably runs at high speed while maintaining a state that the distance from the magnetic head H is as narrow as possible. If an excessively large distance occurs between the magnetic head H and the tape T, a so-called spacing phenomenon arises so that the appropriate state of contact of the tape T to the magnetic tape H can no longer be maintained to result in deteriorations in the magnetic recording or reproduction characteristics of the tape by the off-tracking phenomenon or the like.

If the contact of the tape T to the magnetic head H is excessively strong, on the other hand, friction gradually increases through repeated use, and as a consequence a problem such as deformation of the tape T arises. For this problem, the magnetic recording or reproduction characteristics are deteriorated.

FIG. 4 is a schematic view for describing a new technical problem found by the present inventors. As illustrated in FIG. 4, in a region immediately after the tape T has advanced to the magnetic head H, the tape T comes into a slightly-floating state and a phenomenon can occur in which an "air accumulation space" (designated at sign A) is formed.

The air accumulation space A and the air enclosed in the air accumulation space A tend to continually remain on the magnetic head H while the tape T is running. Further, the air enclosed in the air accumulation space A induces the occurrence of the spacing phenomenon between the magnetic head H and the tape T. Otherwise, the running of the tape T on the magnetic head H is destabilized by the air accumulation space A, so that the air accumulation space A becomes a cause of an increase in friction through stronger contact to the magnetic head H.

Figure 5:
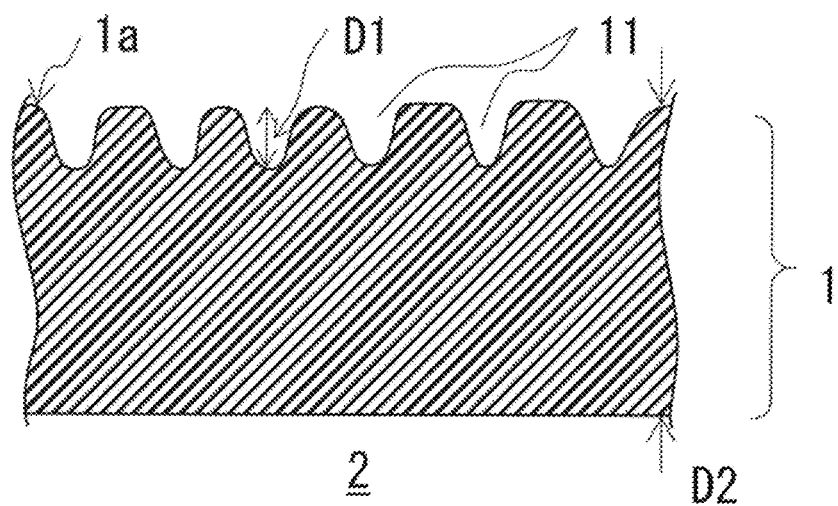
FIG. 5 is a simplified schematic view for describing a concept of indentations (11) in a surface of a magnetic layer (1) of the magnetic recording tape (T).

In this technology, the numerous indentations 11 widely and evenly disposed in the surface 1a of the magnetic layer 1 are arranged to receive the air that exists in the air accumulation space A. FIG. 5 is a simplified schematic view for describing a concept of the indentations 11 in the surface of the magnetic layer 1.

As depicted in FIG. 5 and also in FIG. 2, the fine indentations 11 each of which has a shape indented toward a lower side (toward the non-magnetic layer 2) are widely and evenly formed in the surface 1a of the magnetic layer 1. These indentations 11 individually function as a space for receiving the air in the air accumulation space A (see FIG. 4). Further, the volume of each indentation 11 and the total volume of the indentations 11 existing in the surface of the tape, especially the total volume of the indentations 11 existing in a plane of contact between the tape T and the magnetic head H at a given time point are closely related to the air receiving capacity of the indentations 11.

The tape T with the numerous fine indentations 11 formed in the surface 1a of the magnetic layer 1 can run while receiving air from the air accumulation space A (see FIG. 3 again) into the indentations 11. In other words, the indentations 11 arranged in the magnetic layer 1 function as an air escape space. This means that the indentations 11 also control a negative pressure acting on the magnetic head H and tape T. As a consequence, the indentations 11 suppress the spacing phenomenon to be caused by the air accumulation space A and also suppresses an increase in friction that occurs when the tape A repeatedly runs on the magnetic head H, and consequently can maintain or improve the S/N characteristics of the tape T.

Now, the indentations 11 each have a depth D1 (at the deepest part thereof) (see FIG. 5), which on the basis of a verification relating to this technology, is suitably 7.8 nm or greater, and more suitably 10 nm or greater, because a depth of each indentation 11 smaller than 7.8 nm hardly allows the indentation 11 to function as a space for receiving the air that exists in the air accumulation space A.

In relation to the total thickness D2 of the magnetic layer 1, it is also important how deep each indentation 11 is relative to the total thickness D2. Specifically, in relative relation to the total thickness D2 (see FIG. 5) of the magnetic layer 1, the depth of each indentation 11 may desirably be such that the proportion obtained by dividing the value of the depth D1 of the indentation 11 with the value of the total thickness D2 of the magnetic layer 1, that is, the value of D1/D2 is at least 15% or greater, with a D1/D2 value of 20% or greater being more suitable.

If the ratio of the depth D1 of each indentation 11 to the total thickness D2 of the magnetic layer 1 is smaller than 15%, the function to receive the air existing in the air accumulation space A is lowered. If the ratio exceeds 50%, on the other hand, the thickness of the magnetic layer 1 becomes excessively thin at certain locations, and it is not desirable that adverse effects may occur on the functions of the magnetic layer 1 itself.

The number of the indentations 11 in the surface 1a of the magnetic layer 1 is also important in relation to the total volume of the indentations 11 arranged to receive the above-described air. In a case where a predetermined area: 80 μm×80 μm=6,400 μm$^2$ of the tape T is specified as a unit area (which is equivalent to an area of contact of the tape T with the magnetic head H when the tape T is at rest), 120 or more indentations 11 are desired per the unit area if the depth of each indentation 11 is 15% based on the total thickness D2 of the magnetic layer 1. Further, if the depth of each indentation 11 is 20% based on the total thickness D2 of the magnetic layer 1, 60 or more indentations 11 are suited per the unit area. If there are these numbers of the indentations 11 as described above, the indentations 11 can ensure a sufficient volume for receiving the air existing in the air accumulation space A.

According to a preferred embodiment of this technology, a plurality of indentations as deep as 20% or more of the thickness of a magnetic layer can be formed in the magnetic layer, and the number of the indentations can be preferably 55 or more, and more preferably 60 or more per 6,400 μm$^2$ of the surface area of the magnetic layer. The inclusion of as many indentations as described above or more contributes to the suppression of the dynamic friction coefficient on the head.

In the magnetic layer 1, the magnetic particles may be oriented perpendicularly. In perpendicular orientation, the friction between the tape T and the magnetic head H generally tends to increase, because the magnetic particles align in one direction through perpendicular orientation and the surface shape at the magnetic particle level is hence smoothened. By forming the indentations 11 widely and evenly in the magnetic layer 1 as in this technology, an increase in friction can be suppressed even if the magnetic layer 1 is oriented perpendicularly or even if the tape T is repeatedly used many times. Even with a tape having a magnetic layer 1 the perpendicular orientation of which is, for example, 65% or higher without demagnetization correction, the advantageous effects of this technology can be obtained.

Dynamic friction coefficient of the tape T. If the ratio ($\mu_B/\mu_A$) of the dynamic friction coefficient $\mu_B$ between the surface of the magnetic layer 1 and the magnetic head H when the tension applied to the tape T during running is 0.4 N to the dynamic friction coefficient $\mu_A$ between the surface of the magnetic layer 1 and the magnetic head H when the tension applied to the tape T during running is 1.2 N is preferably 1.0 or greater but 2.0 or smaller, variations in dynamic friction coefficient due to variations in tension during running can be reduced so that the running of the tape can be stabilized. If the ratio ($\mu_{1000}/\mu_5$) of the value $\mu_{1000}$ in Run 1,000 to the value $\mu_5$ in Run 5 of the dynamic friction coefficient $\mu_A$ between the surface of the magnetic layer 1 and the magnetic head when the tension applied to the tape T is 0.6 N is preferably 1.0 or greater but 2.0 or smaller, and more preferably 1.0 or greater but 1.7 or smaller. If the ratio ($\mu_B/\mu_A$) is 1.0 or greater but 2.0 or smaller, variations in dynamic friction coefficient through running many times can be reduced so that the running of the tape can be stabilized.

In a magnetic recording tape according another preferred embodiment of this technology, a plurality of indentations is disposed in a surface of a magnetic layer included in the tape, the value obtained by dividing the depth D1 of each indentation with the thickness D2 of the magnetic layer is 15% or greater, the magnetic layer is perpendicularly oriented, the perpendicular orientation under a condition of no demagnetization correction is 65% or higher, the indentations each have a depth equal to or greater than 20% of the thickness of the magnetic layer, and the number of the indentations can be 55 or more per 6,400 μm$^2$ of the surface area of the magnetic layer. With this magnetic layer, a low dynamic friction coefficient on the head and a good SN ratio can be imparted to the magnetic recording tape. The magnetic recording tape having the magnetic layer is particularly suited for recording or reproduction through running at 4 m/sec or faster.

According to a further embodiment of this technology, the magnetic recording tape has a plural-layer structure including at least a magnetic layer, the tape has a total thickness of 5.6 μm or smaller and includes a plurality of indentations disposed in the surface of the magnetic layer, the value obtained by dividing the depth D1 of each indentation with the thickness D2 of the magnetic layer is 15% or greater, and the magnetic layer is perpendicularly oriented and has a perpendicular orientation of 65% or higher under condition of no demagnetization correction.

According to a still further embodiment of this technology, the magnetic recording tape has a plural-layer structure including at least a magnetic layer, the tape has a total thickness of 5.6 μm or smaller and includes a plurality of indentations disposed in the surface of the magnetic layer, the value obtained by dividing the depth D1 of each indentation with the thickness D2 of the magnetic layer is 15% or greater, the magnetic layer is perpendicularly oriented and has a perpendicular orientation of 65% or higher under condition of no demagnetization correction, and the ratio of the orientation of the magnetic layer in the perpendicular direction to the orientation of the magnetic layer in the longitudinal direction may be 2 or greater.

According to a yet further embodiment of this technology, the tape has a total thickness of 5.6 µm or smaller and includes a plurality of indentations disposed in the surface of the magnetic layer, the value obtained by dividing the depth D1 of each indentation with the thickness D2 of the magnetic layer is 15% or greater, the magnetic layer is perpendicularly oriented and has a perpendicular orientation of 65% or higher under condition of no demagnetization correction, and the depth D1 of each indentation is 7.8 µm or greater.

With the magnetic recording tapes having such configurations as described above, low head dynamic friction coefficients and good SNR ratios can be achieved.

(2-2) Non-Magnetic Layer

Next, the non-magnetic layer 2 (see FIG. 1) arranged underneath the magnetic layer 1 may also be called an "intermediate layer" or an "underlayer" in some instances. This non-magnetic layer 2 is a layer, which is arranged to restrict the effects of a magnetic force on the magnetic layer 1 within the magnetic layer 1 and also to ensure flatness required for the magnetic layer 1. In addition, this non-magnetic layer 2 also plays a role to hold the lubricant added in the magnetic layer and the lubricant added in the non-magnetic layer 2 itself.

This non-magnetic layer 2 is a non-magnetic layer containing a non-magnetic powder and a binder. The non-magnetic layer 2 may further contain at least one additive among a lubricant, conductive particles, a curing agent, an anti-rust agent and the like. The non-magnetic powder contains, for example, at least one of a powder of inorganic particles or a powder of organic particles. Further, the non-magnetic powder may also contain a carbon material such as carbon black. It is to be noted that a single non-magnetic powder may be solely used or two or more non-magnetic powders may be used in combination. The inorganic particles contain, for example, metals, metal oxides, metal carbonates, metal sulfates, metal nitrides, metal carbides, metal sulfides, or the like. As the shape of the non-magnetic powder, examples include, but are not limited to, various shapes such as acicular, spherical, cubic, and platelet. The binder is similar to that in the above-mentioned magnetic layer 1.

The average thickness of the non-magnetic layer 2 is preferably 0.6 µm or greater but 2.0 µm or smaller, and more preferably 0.8 µm or greater but 1.4 µm or smaller. It is to be noted that the average thickness of the non-magnetic layer 2 is determined like the average thickness of the magnetic layer 1. However, the magnification of a TEM image is adjusted as appropriate depending on the thickness of the non-magnetic layer 2. A thickness smaller than 0.6 µm leads to a loss of the holding function for additives (for example, the lubricant) added in the magnetic layer and non-magnetic layer 2 themselves. On the other hand, a thickness greater than 2.0 µm leads to an excessive increase in the total thickness of the tape T, and is against the trend of pursuing higher recording capacity by forming the tape T thinner.

This non-magnetic layer 2 can be formed by conducting coating on the "base film layer 3" to be described next. This non-magnetic layer 2 may take a plural-layer structure depending on the purpose and need. It is important for the non-magnetic layer 2 to use a non-magnetic material, because magnetization of any layer other than the magnetic layer 1 results in a generation source of noise.

The non-magnetic material for use in the non-magnetic layer 2 can be an inorganic material or an organic material. Usable examples of the inorganic material include iron oxyhydroxides, hematite, titanium oxide, carbon black, metal nitrides, metal sulfides, and the like. In addition to such a non-magnetic material, one or more other additives may also be added in some instances. As the shape of the non-magnetic material (non-magnetic powder), examples include, but are not limited narrowly to, various shapes such as acicular, spherical, cubic and platelet.

(2-3) Base Film Layer

Next, the base film layer 3 depicted in FIGS. 1 and 2 plays a role primarily as a layer that serves as a base in the tape T. The base film layer 3 is also called simply a "base layer" or a "non-magnetic substrate." The base film layer 3 is a non-magnetic substrate that supports the non-magnetic layer 2 and the magnetic layer 1 as the upper layer of the non-magnetic layer 2. This base film layer 3 is in the form of an elongated film. The upper limit of the average thickness of the base film layer 3 is 4.5 µm or smaller, more preferably 4.2 µm or smaller, more preferably 3.8 µm or smaller, and still more preferably 3.4 µm or smaller. If the upper limit of the average thickness of the base film layer is 4.2 µm or smaller, the recording capacity to which recording is possible in a single data cartridge can be increased than those of general magnetic recording media. It is to be noted that the lower limit thickness of the base film layer 3 is determined from the viewpoints of limitations from film formation and the functions of the base film layer 3.

The average thickness of the base film layer 3 can be determined as will be described hereinafter. First, a tape T of ½ inch width is provided, and is cut at a length of 250 mm to prepare a sample. Subsequently, the layers other than the base film layer 3 in the sample (specifically the non-magnetic layer 12, magnetic layer 1 and backing layer 4) are removed with a solvent such as MEK (methyl ethyl ketone) or dilute hydrochloric acid. Using as a measurement instrument a LASER HOLOGAGE detector manufactured by Mitsutoyo Corporation, the thickness of the sample (the base film layer 3) is next measured at 5 points or more, the measurement values are simply averaged (subjected to arithmetic mean) to calculate the average thickness of the base film layer 3. It is to be noted that the measurement points shall be chosen at random from the sample.

The base film layer 3 contains at least one of, for example, polyesters, polyolefins, cellulose derivatives, vinyl resins, and other polymer resins. If the base film layer 3 contains two or more of the above-described materials, such two or more materials may have been blended, copolymerized, or laminated together. The polyesters include, for example, PET (polyethylene terephthalate), PEN (polyethylene naphthalate), PBT (polybutylene terephthalate), PEN (polybutylene naphthalate), PCT (polycyclohexylenedimethylene terephthalate), PEB (polyethylene-p-oxybenzoate), and polyethylene bisphenoxy carboxylate. The polyolefins include, for example, PE (polyethylene) and PP (polypropylene). The cellulose derivatives include, for example, cellulose diacetate, cellulose triacetate, CAB (cellulose acetate butyrate), and CAP (cellulose acetate propionate). The vinyl resins include, for example, PVC (polyvinyl chloride) and PVDC (polyvinylidene chloride). The other polymer resins include, for example, PAs (polyamides, nylons), aromatic PAs (aromatic polyamides, aramids), PAIS (polyamideimides), aromatic PAIS (aromatic polyamideimides), PBOs (polybenzoxazoles, for example, ZYLON (registered trademark)), polyethers, PEKs (polyetherketones), polyetheresters, PESs (poly ethersulfones), PEIs (polyetherimides), PSFs (polysulfones), PPSs (polyphenylene sulfides), PCs (polycarbonates), PARs (polyarylates), and PUs (polyurethanes). The material of the base film layer 3 is not particularly narrowly limited, but may be determined according to the tape standards. In the LTO standards, for example, PEN is specified.

(2-4) Backing Layer

The backing layer 4 depicted in FIGS. 1 and 2 plays a role to control the friction that occurs when the tape T runs at high speed while opposing the magnetic head, a role to prevent winding disorders, and the like. In other words, the backing layer 4 plays a fundamental role to allow the tape T to stably run at high speed.

The backing layer 4 contains a binder and a non-magnetic powder. The backing layer 4 may further contain at least one additive of a lubricant, a curing agent, an anti-static agent or the like as needed. The binder and non-magnetic powder are similar to those in the above-mentioned non-magnetic layer 12.

The average particle size of the non-magnetic powder is preferably 10 nm or greater but 150 nm or smaller, and more preferably 15 nm or greater but 110 nm or smaller. The average particle size of the non-magnetic powder is determined like the above-described average particle size of the magnetic powder. The non-magnetic powder may contain a non-magnetic powder having two or more particle size distributions.

The upper limit of the average thickness of the backing layer 4 is preferably 0.6 μm or smaller. When the upper limit of the average thickness of the backing layer 4 is 0.6 μm or smaller, the non-magnetic layer 2 and base film layer 3 can be kept thick even if the average thickness of the tape T is 5.6 μm. As a consequence, the running stability of the tape T in the recording and reproduction apparatus can be maintained high. The lower limit of the average thickness of the backing layer 4 is, for example, 0.2 μm or greater, although no particular limitation is imposed thereon.

The average thickness of the backing layer 4 can be determined as will be described hereinafter. First, a tape T of ½ inch width is provided, and is cut at a length of 250 mm to prepare a sample. Using as a measurement instrument the LASER HOLOGAGE detector manufactured by Mitsutoyo Corporation, the thickness of the sample is next measured at 5 points or more, and the measurement values are simply averaged (subjected to arithmetic mean) to calculate the average value $t_T$ [μm] of the thickness of the tape T. It is to be noted that the measurement points shall be chosen at random from the sample. Subsequently, the backing layer 4 in the sample is removed with a solvent such as MEK (methyl ethyl ketone) or dilute hydrochloric acid. Using the above-described LASER HOLOGAGE detector again, the thickness of the sample is then measured at 5 points or more, and the measurement values are simply averaged (subjected to arithmetic mean) to calculate the average value $t_B$ [μm] of the thickness of the tape T from which the backing layer 4 has been removed. It is to be noted that the measurement points shall be chosen at random from the sample. Then, the average thickness $t_b$ [μm] of the backing layer 4 is determined by the following formula.

$$t_b\ [\mu m] = t_T\ [\mu m] - t_B\ [\mu m]$$

The thickness of the backing layer 4 is desirably 100 nm or greater. A thickness of smaller than 100 nm leads to a higher electrical resistance, and hence to the occurrence of a problem of deteriorated compatibility with the magnetic head H. Concerning the upper limit thickness, it is sufficient if a minimum thickness capable of exhibiting the functions of the backing layer 3, especially a thickness necessary and sufficient for the high-speed and stable running of the tape T in the recording and reproduction apparatus is secured. In this viewpoint, a thickness of greater than 1 μm is not particularly needed.

The backing layer 4 is formed with a composition containing a binder and a non-magnetic powder, and a lubricant and a curing agent may also be added as needed. Further, an anti-static agent may also be added to provide the backing layer 4 with an anti-static function so that adhesion of dust and debris is prevented.

In this technology, a number of nano-order fine projections (projecting portions) 41 is disposed beforehand on a surface 4a of the backing layer 4 (see FIG. 2). The projections 41 are used to form the above-mentioned indentations 11 in the surface 1a of the magnetic layer 1. To achieve this purpose, the projections 41 are required to have a predetermined height or more and to be as many as needed per unit area of the tape (a description will be made subsequently herein).

Figure 6:
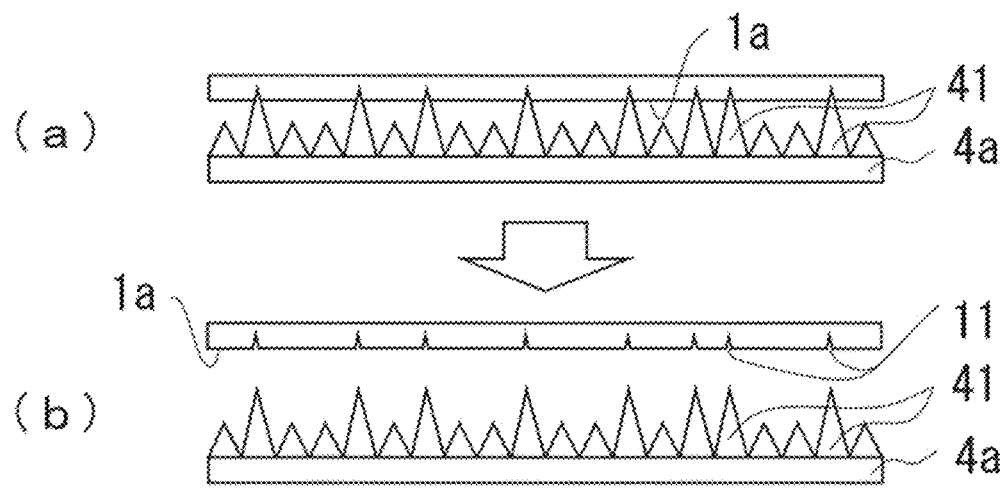
FIG. 6 is a simplified, schematic, enlarged view illustrating how the indentations (11) are transferred to a surface of a magnetic layer (1) of the tape (T) from projections (41) on a backing layer (4) and are formed there.

FIG. 6 is a simplified, schematic, enlarged view illustrating how the indentations 11 are formed in the surface 1a of the magnetic layer 1 by transferring the projections 41 that exist on the backing layer 4. As illustrated in FIG. 6, the surface 1a of the magnetic layer 1 of the tape T is placed opposite and pressed against the surface 1a of the backing layer 4 (see FIG. 6(a)). When the magnetic layer 1 is pulled apart from the backing layer 4 after having been pressed for a predetermined time, the indentations 11 are transferred into the surface of the magnetic layer 1 and remain there (see FIG. 6(b)). In other words, in this technology, the indentations arranged in the magnetic layer as the uppermost layer may be those formed by pressing the projections formed on the surface of the backing layer arranged as the lowermost layer.

For example, after coating the magnetic layer 1, the tape T including the magnetic layer 1, which is still in an undried state, is taken up on a roll (take-up core). Then, the surface 4a, with the projections 41 included thereon, of the backing layer 4 of the tape T, which has been progressively taken up one turn outside, is naturally pressed (tightened) against the surface 1a of the magnetic layer 1. Using a pressing pressure at this time, the indentations 11 can be transferred into the surface 1a of the magnetic layer.

The projections 41 on the backing layer 4 can be formed, for example, by mixing carbon particles of a small particle size (hereinafter "small particles") and carbon particles of a particle size relatively greater than the small particle size (hereinafter "large particles") at a predetermined ratio. A rugged structure is formed on the surface of the backing layer 4, and the portions of the projections 41 in the structure are used to form the indentations 11 in the magnetic layer 1. It is to be noted that as the large particles, a material such as alumina, silica or titanium oxide may be used.

Here, the small particles are particles having an average particle size in a range of 15 to 30 nm, and as the large particles, on the other hand, selection of particles having an average particle size in a range of 200 to 350 nm is suited. As the difference in particle size between the small particles and the large particles, a range of 170 to 335 nm is needed. If the difference in particle size between the small particles and the large particles is too small, the ruggedness on the backing layer 4 is flattened, leading to a difficulty in forming the indentations 11 in the magnetic layer 1. If the difference in particle size between the small particles and the large particles is too large, on the other hand, the rugged structure becomes extremely severer, causing a problem such that the depth of the indentations 11 becomes excessively large.

Further, the proportions of the large particles and small particles are also important when they are mixed. It is desired to add 80 to 90 mass % of the small particles relative to 10 to 20 mass % of the large particles. If the large particles fall below 10 mass %, the projections 41 are not formed sufficiently. If the large particles exceed 20 mass %, on the other hand, the projections 41 become too many (valley portions become too few), leading to a difficulty in forming the indentations 11 in the magnetic layer 1.

The projections 41 can have any height insofar as the indentations 11 can be formed at a depth of an intended dimension in the magnetic layer 1, and no narrowing limitation is imposed on the height of the projections 41. However, a height of, for example, 40 nm or greater, more suitably 60 nm or greater is desired. A height smaller than 40 nm renders the projections 41 difficult to penetrate into the surface of the magnetic layer 1, so that the indentations 11 are hardly formed. It is to be noted that there is no particular need to subject the surface of the backing layer 4 to smoothening after the transfer step if the projections 41 have a height of such a dimension.

Further, if the number of the projections 41 of a height of 60 nm or greater is, for example, 30 or greater if specified per the unit area 80 μm×80 μm=6,400 μm² of the backing layer 4, the indentations 11 can be widely and evenly formed in the surface of the magnetic layer 1 so that this condition is desired.

(3) About Basic Manufacturing Method of the Tape T According to this Technology

Figure 7:
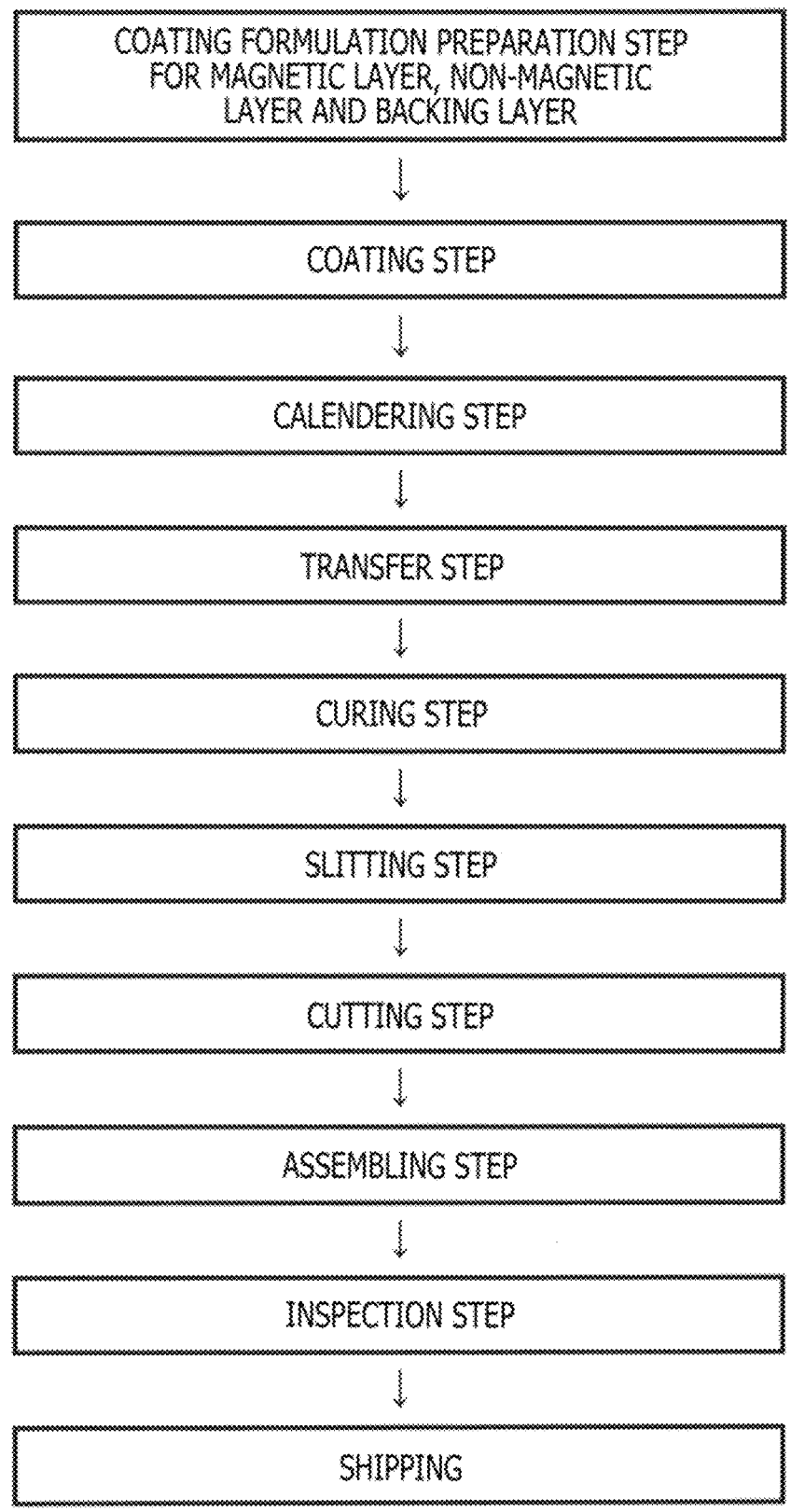
FIG. 7 is a basic flow diagram of a tape manufacturing process according to this technology.

A description will next be made about a manufacturing process of the tape T having the above-mentioned configurations (see FIG. 7).

(Coating Formulation Preparation Step)

First, a non-magnetic powder, a binder, a lubricant and the like are kneaded and/or dispersed in a solvent to prepare a non-magnetic layer forming coating formulation. Next, a magnetic powder, a binder, a lubricant and the like are kneaded and/or dispersed in a solvent to prepare a magnetic layer forming coating formulation. Then, a binder, a non-magnetic powder and the like are kneaded and/or dispersed in a solvent to prepare a backing layer forming coating formulation. For the preparation of the magnetic layer forming coating formulation, non-magnetic layer forming coating formulation and backing layer forming coating formulation, the following solvents, dispersing machines and kneading machines can be used.

As the solvents for use in the above-mentioned preparation of the coating formulations, examples include ketone solvents such as acetone, methyl ethyl ketone, methyl isobutyl ketone and cyclohexanone, alcohol solvents such as methanol, ethanol and propanol, ester solvents such as methyl acetate, ethyl acetate, butyl acetate, propyl acetate, ethyl lactate and ethylene glycol acetate, ether solvents such as diethylene glycol dimethyl ether, 2-ethoxyethanol, tetrahydrofuran and dioxane, aromatic hydrocarbon solvents such as benzene, toluene and xylene, halogenated hydrocarbon solvents such as methylene chloride, ethylene chloride, carbon tetrachloride, chloroform and chlorobenzene, and the like. These solvents may be used either singly or in appropriate combination.

The kneading machines for use in the above-mentioned preparation of the coating formulations include, for example, but are not particularly limited to, kneading machines such as continuous twin-screw kneading machines, continuous twin-screw kneading machines capable of multistep dilution, kneaders, pressure kneaders, and roll kneaders. The dispersing machines for use in the above-mentioned preparation of the coating formulations include, for example, but are not particularly limited to, dispersing machines such as roll mills, ball mills, horizontal sand mills, vertical sand mills, spike mills, pin mills, tower mills, pearl mills (for example, "DCP Mill" manufactured by Maschinen Fabrik Gustav Eirich GmbH & Co KG, and the like), homogenizers, and ultrasonic dispersing machines.

For example, the magnetic layer forming coating formulation is prepared as will be described hereinafter. First, a first composition of the below-described recipe is kneaded in an extruder. Next, the kneaded first composition and a second composition of the below-descried recipe are added to an agitation tank including an emulsifying mixer, followed by pre-mixing. Subsequently, mixing is conducted in a sand mill, followed by filtering to prepare the magnetic layer forming coating formulation.

(First Composition)

Powder (hexagonal platelet, aspect ratio 2.8, particle volume: 1,950 nm³) of barium ferrite ($BaFe_{12}O_{19}$) particles: 100 parts by mass Vinyl chloride resin (30 mass % solution in cyclohexanone): 10 parts by mass (polymerization degree 300, Mn=10,000, contains, as polar groups, $OSO_3K$ at 0.07 mmol/g and secondary OH at 0.3 mmol/g)

Aluminum oxide powder: 5 parts by mass ($\alpha$-$Al_2O_3$, average particle size 0.2 μm)

Carbon black: 2 parts by mass (product of Tokai Carbon Co., Ltd., tradename: SEAST TA).

(Second Composition)

Vinyl chloride resin: 1.1 parts by mass (resin solution: resin content 30 mass %, cyclohexanone 70 mass %)

n-Butyl stearate: 2 parts by mass

Methyl ethyl ketone: 121.3 parts by mass

Toluene: 121.3 parts by mass

Cyclohexanone: 60.7 parts by mass

Finally, to the magnetic layer forming coating formulation prepared as mentioned above, 4 parts by mass of a polyisocyanate (tradename: CORONATE L, product of Nippon Polyurethane Industry Co., Ltd.) and 2 parts by mass of myristic acid are added as curing agents.

Next, the non-magnetic layer coating formulation can be prepared as will be described hereinafter.

First, a third composition of the below-described recipe is kneaded in an extruder. Next, the kneaded third composition and a fourth composition of the below-descried recipe are added to an agitation tank including an emulsifying mixer, followed by pre-mixing. Subsequently, mixing is conducted in a sand mill, followed by filtering to prepare the non-magnetic layer forming coating formulation.

(Third Composition)

Acicular iron oxide powder: 100 parts by mass ($\alpha$-$Fe_2O_3$, average major-axis length 0.15 μm)

Vinyl chloride resin: 55.6 parts by mass (resin solution: resin content 30 mass %, cyclohexanone 70 mass %)

Carbon black: 10 parts by mass (average particle size 20 nm)

(Fourth Composition)

Polyurethane resin UR8200 (product of Toyobo Co., Ltd.): 18.5 parts by mass n-Butyl stearate: 2 parts by mass Methyl ethyl ketone: 108.2 parts by mass Toluene: 108.2 parts by mass Cyclohexanone: 18.5 parts by mass Finally, to the non-magnetic layer forming coating formulation prepared as mentioned above, 4 parts by mass of the polyisocyanate (tradename: "CORONATE L," product of Nippon Polyurethane Industry Co., Ltd.) and 2 parts by mass of myristic acid are added as curing agents.

(Preparation Step of Backing Layer Forming Coating Formulation)

The backing layer forming coating formulation is prepared as will be described hereinafter. The below-described materials are subjected to mixing in an agitation tank including an emulsifying mixer, followed by filtering to prepare the backing layer forming coating formulation.

Powder of carbon black particles (average particle size 20 nm): 90 parts by mass Powder of carbon black particles (average particle size 270 nm): 10 parts by mass Polyester polyurethane: 100 parts by mass (product of Nippon Polyurethane Industry Co., Ltd., tradename: N-2304)

Methyl ethyl ketone: 500 parts by mass

Toluene: 400 parts by mass

Cyclohexanone: 100 parts by mass

It is to be noted that the amount of the powder of carbon black particles (average particle size 20 nm) may be changed to 80 parts by mass and the amount of the powder of carbon black particles (average particle size 270 nm) may be changed to 20 parts by mass. From the viewpoint of the formation of projections on the backing layer 4, it is not preferred to change the amount of the powder of carbon black particles (average particle size 270 nm) to 100 parts by mass.

(Coating Step)

Next, the non-magnetic layer forming coating formulation is applied to one of principal surfaces of a base film layer 3, and is dried (cured) to form a non-magnetic layer 2. Subsequently, the magnetic layer forming coating formulation is applied to the non-magnetic layer 2, and is dried to form a magnetic layer 1 on the non-magnetic layer 2. Here, upon drying, the magnetic powder may preferably be subjected to magnetic field orientation in the thickness direction of the base film layer 3, for example, by a solenoid coil. As an alternative, upon drying, the magnetic powder may be subjected to magnetic field orientation in the running direction (longitudinal direction) of the base film layer 3, and may then be subjected to magnetic field orientation in the thickness direction of the base film layer 3, both by a solenoid coil, for example. After the formation of the magnetic layer 1, the backing layer forming coating formulation is applied to the other principal surface of the base film 3, and is dried to form a backing layer 4. As a consequence, a tape T is obtained.

Using the magnetic layer forming coating formulation and non-magnetic layer forming coating formulation prepared as mentioned above, a non-magnetic layer 2 with an average thickness of 1.0 to 1.1 μm and a magnetic layer 1 with an average thickness of 40 to 100 nm are formed on one of principal surfaces of an elongated polyethylene naphthalate film (hereinafter "PEN film") as a base film layer as will be described hereinafter. First, the non-magnetic layer forming coating formulation is applied to the one principal surface of the PEN film, and is dried to form the non-magnetic layer 2. Next, the magnetic layer forming coating formulation is applied to the non-magnetic layer 2, and is dried to form the magnetic layer 1.

Here, upon drying the magnetic layer forming coating formulation, the magnetic powder is subjected to magnetic field orientation in the thickness direction of the film by a solenoid coil. The squareness ratio (orientation) can be controlled, for example, by adjusting the intensity of a magnetic field to be generated from the solenoid coil (for example, to two to three times the coercive force of the magnetic powder), by adjusting the solid contents of the magnetic layer forming coating formulation, or by adjusting drying conditions (drying temperature and drying time), or by a combination of these adjustments. As an alternative, the squareness ratio can also be controlled by adjusting the time that is required to allow the magnetic powder to orient in a magnetic field. To increase the squareness ratio, for example, it is preferred to improve the state of dispersion of the magnetic powder in the coating formulation. For orientation in the perpendicular direction, on the other hand, advance magnetization of the magnetic powder before entry to an orientation device is also an effective method, and therefore this method may be used. By conducting such adjustments, the squareness ratio in the perpendicular direction (in the thickness direction of the magnetic tape) and/or in the longitudinal direction (in the longitudinal direction of the magnetic tape) can be set at a desired value. Subsequently, the backing layer forming coating formulation is applied to the other principal surface of the PEN film, and is dried to form the non-magnetic layer 2. By the illustrative method described above, the tape T is obtained.

(Calendaring Step)

Calendaring treatment is next applied to smoothen the surface of the magnetic layer. This calendaring step is a step in which mirror finish is applied using a machine generally called a "calendar," and in this technology, is included as a pretreatment step before a transfer step. The calendaring step is a step in which, while feeding and nipping the tape T between opposing, metal-made rolls, the surface of the magnetic layer 1 is finished smooth by applying temperature and pressure as needed. The transfer step will be conducted after this calendaring step.

(Transfer Step)

After the calendared tape T has been taken up in a roll form, the tape T is subjected to heat treatment in this state so that the numerous projections 41 on the surface of the backing layer 4 are transferred into the surface 1a of the magnetic layer 1. Subsequently, the magnetic layer 1 is cured. As a consequence, numerous indentations 11 are formed in the surface 1a of the magnetic layer 1. Therefore, the numerous indentations 11 can be suitably formed in the surface 1a of the magnetic layer 1 by transferring the numerous projections 41, which are arranged on the surface of the backing layer 4, into the surface 1a of the magnetic layer 1. Nonetheless, the formation of the numerous indentations 11 is not limited to this method. For example, the numerous indentations 11 may also be formed in the surface of the magnetic layer 1 by appropriately selecting the kind of a solvent to be contained in the magnetic layer forming coating formulation, the drying conditions for the magnetic layer forming coating formulation, and so on.

(Slitting Step)

The magnetic tape obtained as mentioned above is slit, for example, at ½ inch (12.65 mm) widths. As a consequence, the target elongated tape T can be obtained.

(4) Example of Transfer Step for the Formation of Indentations in the Surface of Magnetic Layer For the manufacture of the tape T according to this technology, the respective coating formulations for the magnetic layer 1, non-magnetic layer 2 and backing layer 4, which are to be applied to the base film layer 3, are prepared in advance (coating formulation preparation step), and these coating formulations are applied to the base film 3 in a predetermined order while monitoring the thickness of each layer (coating step). Subsequently, the resulting tape is processed and taken up on a drum through the orientation step (the step in which the magnetic powder that forms the magnetic layer is aligned in direction), the calendaring step, the transfer step and the curing step in this order.

Then, the resulting tape is slit at tape widths corresponding to the product type (slitting step), and the resulting slit tapes are cut at tape lengths according to the product standards (cutting step). Finally, the resulting cut tapes are assembled into cartridge cases corresponding to the target products to obtain magnetic recording tape cartridges (assembling step), and after a predetermined inspection step, the magnetic recording tape cartridges are shipped. FIG. 7 is a basic flow diagram of a tape manufacturing process according to this technology.

Figure 8:
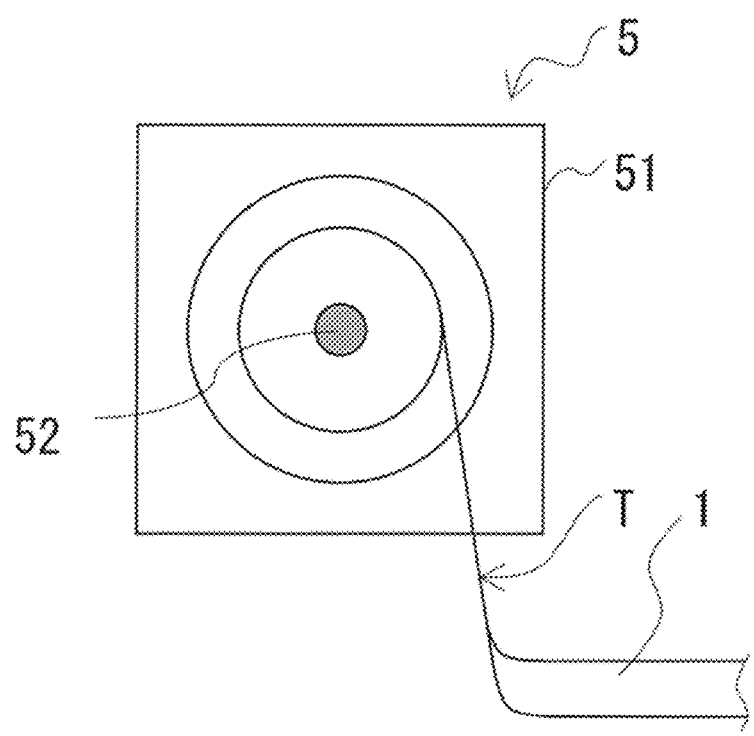
FIG. 8 is a view illustrating an embodiment of a tape cartridge (5) with the magnetic recording tape (T) according to this technology contained in a case (51).

FIG. 8 is a view illustrating an embodiment of a tape cartridge 5 with the magnetic recording tape T according to this technology contained in a case 51. The case 51 is chosen depending of the use and purpose of the magnetic recording tape. The tape T is wound over a predetermined length on a reel 52 arranged in the case 51, and upon recording on or reproduction from the tape T, is taken out from the case 51 and is used. Therefore, this technology also provides a magnetic recording tape cartridge of a configuration in which the magnetic recording tape according to this technology is contained in the case with the magnetic recording tape wound on the reel.

Figure 9:
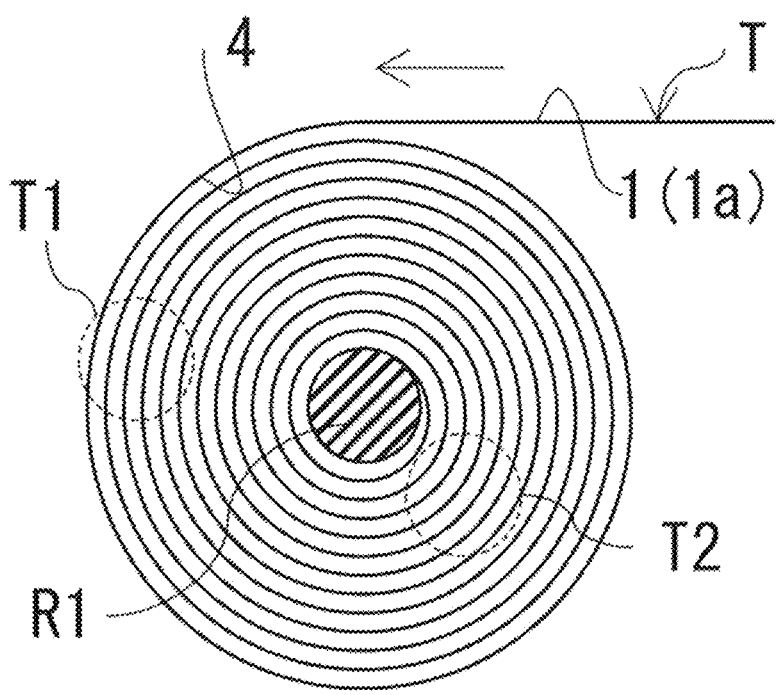
FIG. 9 is a concept view for describing a preferred example of a transfer step for the magnetic recording tape (T).

Here, FIG. 9 is a basic concept view for describing an example of the manufacturing method of the tape T. In this technology, the transfer step in which the indentations 11 are formed in the surface 1a of the magnetic layer 1 is conducted at a stage after forming the magnetic layer 1 by coating but before curing the magnetic layer 1.

Figure 10:
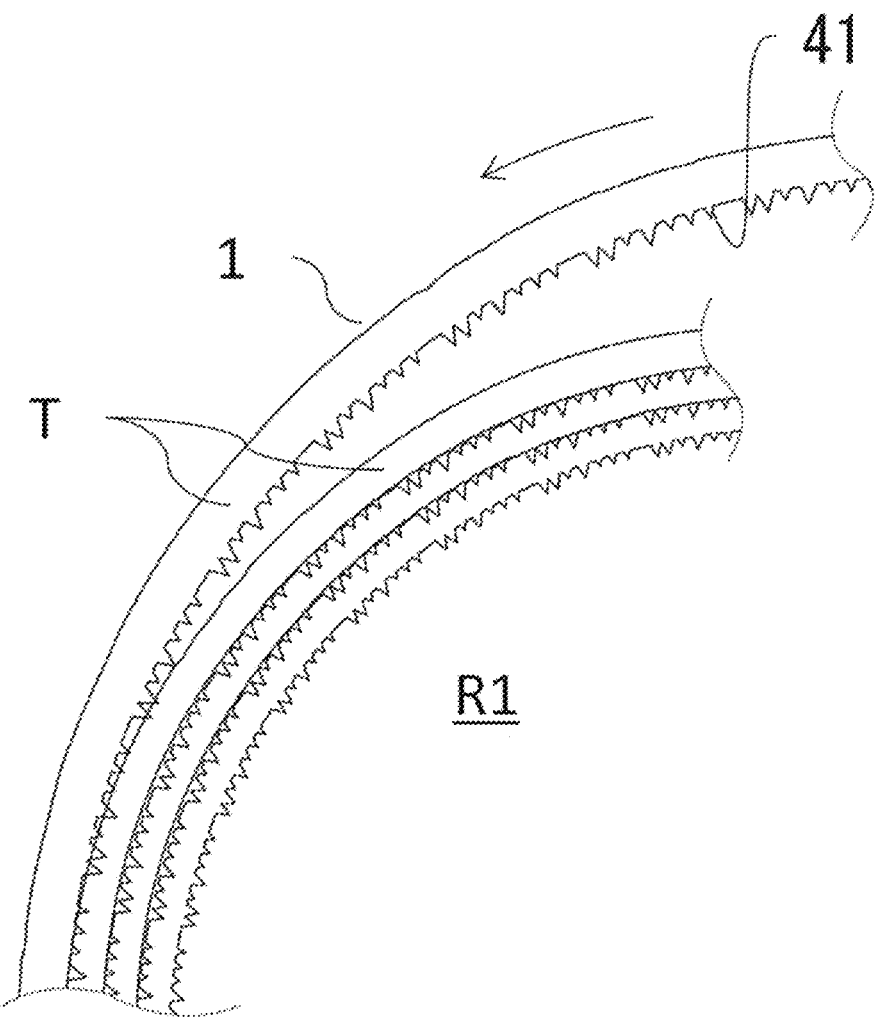
FIG. 10 is a view illustrating how the tape (T) is progressively taken up on a roll (R1) and projections 41 on the backing layer 4 are brought into contact with the surface of the magnetic layer 1 in the transfer step.

Specifically, after the surface of the coated magnetic layer 1 is subjected to smoothening (calendaring step), the tape T is brought into a state that it is wound on a roll R1, and the transfer step (the step of pressing the projections 41 on the backing layer 4 against the magnetic layer 1) is conducted under an atmospheric temperature condition (environmental temperature condition around the tape) of 60° C. to 70° C. FIG. 10 is a view illustrating how the tape T is progressively taken up on the roll R1 and the projections 41 on the backing layer 4 are brought into contact with the surface of the magnetic layer 1 in the transfer step.

The temperature of the heat treatment in the transfer step is preferably 55° C. or higher but 75° C. or lower. If the temperature of the heat treatment is 55° C. or higher, good transfer performance can be obtained. If the temperature of the heat treatment is 75° C. or higher, on the other hand, the count of pores becomes excessively large so that the lubricant on the surface becomes too much. Here, the temperature of the heat treatment means the temperature of an atmosphere in which the tape T is held. As another temperature condition for the transfer step, a temperature right below the temperature at which sticking begins to occur between the magnetic layer 1 and the backing layer 4 can be set as an upper limit.

The time of the heat treatment is preferably 15 hours or longer but 40 hours or shorter. If the time of the heat treatment is longer than 15 hours or longer, good transfer performance can be obtained. If the time of the heat treatment is 40 hours or shorter, on the other hand, it is possible to suppress a decrease in productivity.

If the transfer step is conducted only once, good results can be obtained when under a temperature condition of 60° C. as the atmosphere temperature, for example, the transfer step is conducted for 20 hours or longer, more preferably 25 hours or longer. A transfer time shorter than 15 hours is, therefore, not considered to be a sufficient transfer processing time.

If the transfer step is conducted only once, a difference arises in tightening force between a region T1 on an outer side of the roll R1 and a region T2 in a vicinity of the roll R1, causing a tendency that the formation of the indentations 11 is insufficient in the region T1 on the outer side.

Figure 11:
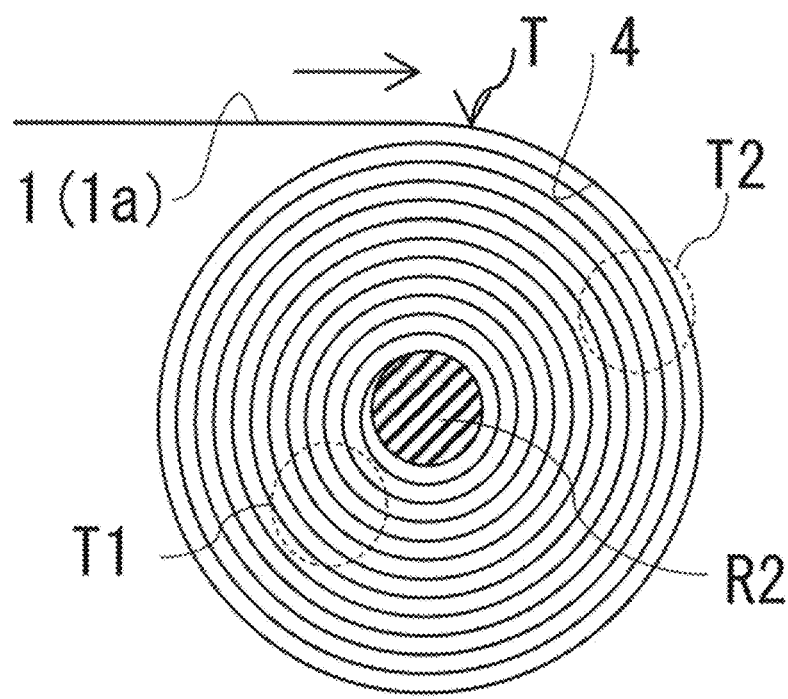
FIG. 11 is a view illustrating a concept of a second-time transfer step.

In this technology, it is hence configured that as illustrated in FIG. 11, the tape T which is wound on the roll R1 and has been completely processed through the first-time transfer step is taken out in an opposite direction and is taken up on another roll R2, and the transfer step is conducted again. In other words, the tape T is taken up again so that the tape T1 located in the region on the outer side of the roll R1 in the first-time transfer step is positioned in a region near the roll R2 and the tape T2 located in the region inside the roll R1 in the first-time transfer step is positioned in a region on an outer side of the roll R2 (see FIGS. 9 and 11). As a consequence, the tightening force can be equalized over the entire length of the tape, and the formation of the indentations can be uniformly conducted.

In the twice transfer step, good results were obtained when under the condition of an atmosphere temperature of 55° C. to 75° C., the first-time and second-time transfer times were each set for 10 hours. In once transfer, it is hence more suited to conduct the transfer for 25 hours or longer under the condition of an atmosphere temperature of 55° C. or higher, and preferably 60° C. or higher. If second-time transfer is conducted, it is more suited to conduct the transfer for 10 hours or longer under a similar temperature condition as in the first-time transfer. It is to be noted that the conditions of temperature and treatment time for the first-time transfer step and those for the second-time transfer step may be the same, the condition of stronger transfer may be adopted for the second time, or the condition of weaker transfer may be adopted for the second time. The transfer step may also be conducted three times or more.

This technology can also adopt the following configurations.

(1) A magnetic recording tape having:

a plural-layer structure including at least a magnetic layer, in which:

the tape has a total thickness of 5.6 μm or smaller, and includes a plurality of indentations disposed in a surface of the magnetic layer, a value obtained by dividing a depth D1 of the indentations with a thickness D2 of the magnetic layer is 15% or greater, the magnetic layer is perpendicularly oriented, and has a perpendicular orientation of 65% or higher under condition of no demagnetization correction, and the magnetic layer includes a plurality of indentations formed therein, a plurality of the indentations has a depth of 20% or greater of the thickness of the magnetic layer, and the number of the indentations is 55 or more per 6,400 μm² of a surface area of the magnetic layer.

(2) The magnetic recording tape according to (1), in which a ratio of an orientation of the magnetic layer in a perpendicular direction to an orientation of the magnetic layer in a longitudinal direction is 2 or greater.

(3) The magnetic recording tape according to (1) or (2), in which the number of the indentations per 6,400 μm² of the surface area of the magnetic layer is 120 or greater.

(4) The magnetic recording tape according to any one of (1) to (3), in which
the surface of the magnetic layer has a minus Ssk value as determined by non-contact optical interferometric roughness measurement.

(5) The magnetic recording tape according to any one of (1) to (4), in which
the tape is a tape that runs at 4 meters/second or faster during recording or reproduction via a magnetic head.

(6) The magnetic recording tape according to any one of (1) to (5), in which
the indentations disposed in the magnetic layer as an uppermost layer have been formed by pressing projections, which are formed on a surface of a backing layer disposed as a lowermost layer.

(7) The magnetic recording tape according to any one of (1) to (6), in which
the tape includes the magnetic layer, a non-magnetic layer, a base film layer and the backing layer in this order from a side where the tape opposes a magnetic recording head during running of the tape.

(8) The magnetic recording tape according to any one of (1) to (7), in which
the total thickness is 4.6 µm or smaller.

(9) A magnetic recording tape having:
a plural-layer structure including at least a magnetic layer, in which
the tape has a total thickness of 5.6 µm or smaller, and includes a plurality of indentations disposed in a surface of the magnetic layer,
a value obtained by dividing a depth D1 of the indentations with a thickness D2 of the magnetic layer is 15% or greater, and
the magnetic layer is perpendicularly oriented, and has a perpendicular orientation of 65% or higher under condition of no demagnetization correction.

(10) A magnetic recording tape having:
a plural-layer structure including at least a magnetic layer, in which:
the tape has a total thickness of 5.6 µm or smaller, and includes a plurality of indentations disposed in a surface of the magnetic layer,
a value obtained by dividing a depth D1 of the indentations with a thickness D2 of the magnetic layer is 15% or greater, and
the depth D1 of the indentations is 7.8 µm or greater.

(11) A magnetic recording tape having:
a plural-layer structure including at least a magnetic layer, in which:
the tape has a total thickness of 5.6 µm or smaller, and includes a plurality of indentations disposed in a surface of the magnetic layer,
a value obtained by dividing a depth D1 of the indentations with a thickness D2 of the magnetic layer is 15% or greater, and
a ratio of an orientation of the magnetic layer in a perpendicular direction to an orientation of the magnetic layer in a longitudinal direction is 2 or greater.

(12) A magnetic recording tape cartridge having:
a configuration that the magnetic recording tape according to any one of (1) to (11) is contained in a case in a state with the magnetic recording tape wound on a reel.

(13) A manufacturing method of a magnetic recording tape including:
a transfer step of, while taking up, on a roll, a magnetic recording tape of a plural-layer structure including at least a magnetic layer and a backing layer, pressing projections, which are formed on a surface of the backing layer, against a surface of the magnetic layer, whereby indentations are formed in the magnetic layer.

(14) The manufacturing method according to (13), in which
the transfer step is further conducted by taking out the tape, which has been taken up once, in an opposite direction and taking up the tape on another roll.

(15) The manufacturing method according to (13) or (14), in which
the transfer step includes heat treatment to be conducted at a temperature of 55° C. or higher and 75° C. or lower with the projections pressed against the surface of the magnetic layer.

The description has hereinabove been specifically made about the embodiment disclosed herein and its modifications. However, this technology is not limited to the above-mentioned embodiment and modifications, but a variety of modifications is possible on the basis of the technical concept of this technology. For example, the configurations, methods, steps, shapes, materials, numerical values, and the like, which have been mentioned in the above-mentioned embodiment and modifications, are merely illustrative, and different configurations, methods, steps, shapes, materials, numerical values, and the like may be used as needed. Further, the chemical formulas of the compounds and the like are representative ones, and are not limited to the described valence numbers and the like insofar as they are common names of the same compounds. Furthermore, the configurations, methods, steps, shapes, materials, numerical values, and the like in the above-mentioned embodiment and its modifications can be combined together insofar as they do not depart from the spirit of this disclosure.

EXAMPLES (Experiment 1)
The present inventors conducted evaluation of each magnetic recording tape primarily based on the relation between the depth and number of indentations in the magnetic layer, between the height and number of projections on the backing layer, and the like.

Magnetic recording tapes of Examples 1 to 14 and Comparative Examples 1 to 8 presented below in Table 1 were each produced. Adjustment of the orientation of the magnetic recording tapes was conducted as will be described hereinafter. Specifically, a PEN film that had an elongated shape and an average thickness of 4.0 µm was provided as a base film layer. A non-magnetic layer (underlayer) forming coating formulation was applied to the PEN film, followed by drying to form a non-magnetic layer having an average thickness of 1.0 to 1.1 µm on the PEN film. A magnetic layer forming coating formulation was applied to the non-magnetic layer, followed by drying to form, on the non-magnetic layer, a magnetic layer of the average thickness presented below in Table 1. Upon drying the magnetic layer forming coating formulation, the magnetic powder was subjected to magnetic field orientation in the thickness direction of the PEN film by a solenoid coil so that the orientation of the resulting magnetic recording tape was adjusted to the value presented below in Table 1.

The magnetic recording tapes of the Examples and Comparative Examples presented below in Table 1 all had a thickness of 5.6 µm.

Features (the thickness of the magnetic layer, the perpendicular orientation, the longitudinal orientation, the shape of the magnetic powder, the kind of an element contained other than ferrite) and evaluation results of the tape of each Example or Comparative Example are tabulated in Table 1.

TABLE 1

| | | Magnetic layer | | | | | | | |
|---|---|---|---|---|---|---|---|---|---|
| | | Indentations having depth equal to 15% or greater based on thickness of magnetic layer | | Indentations having depth equal to 20% or greater based on thickness of magnetic layer | | Number of projections of 60 nm or greater height (per 6,400 μm² area) on backing coat layer | Particle proportions for backing coat layer (%) | | Perpendicular orientation (without demagnetization correction (%)) |
| Example No. | Thickness of magnetic Layer | Depth (nm) | Number of indentations (per 6,400 μm² area) | Depth (nm) | Number of indentations (per 6,400 μm² area) | | Large particles (270 nm) | Small particles (20 nm) | |
| Ex. 1 | 87 | 13.1 | 121 | 17.4 | 62 | 32 | 10 | 90 | 65 |
| Ex. 2 | 81 | 12.2 | 125 | 16.2 | 64 | 36 | 10 | 90 | 66 |
| Ex. 3 | 85 | 12.8 | 122 | 17.0 | 61 | 31 | 10 | 90 | 71 |
| Ex. 4 | 78 | 11.7 | 123 | 15.6 | 64 | 34 | 10 | 90 | 70 |
| Ex. 5 | 89 | 13.4 | 132 | 17.8 | 80 | 38 | 10 | 90 | 66 |
| Ex. 6 | 88 | 13.2 | 158 | 17.6 | 66 | 32 | 10 | 90 | 67 |
| Ex. 7 | 87 | 13.1 | 122 | 17.4 | 68 | 53 | 20 | 80 | 65 |
| Ex. 8 | 71 | 10.7 | 121 | 14.2 | 63 | 31 | 10 | 90 | 66 |
| Ex. 9 | 52 | 7.8 | 120 | 10.4 | 61 | 31 | 10 | 90 | 66 |
| Ex. 10 | 86 | 12.9 | 124 | 17.2 | 60 | 32 | 10 | 90 | 68 |
| Ex. 11 | 88 | 13.2 | 122 | 17.6 | 62 | 31 | 10 | 90 | 65 |
| Ex. 12 | 87 | 13.1 | 125 | 17.4 | 64 | 31 | 10 | 90 | 67 |
| Ex. 13 | 85 | 12.8 | 122 | 17.0 | 61 | 33 | 10 | 90 | 66 |
| Ex. 14 | 89 | 13.4 | 121 | 17.8 | 101 | 52 | 10 | 90 | 65 |
| Ex. 15 | 87 | 13.0 | 121 | 17.2 | 61 | 32 | 10 | 90 | 75 |
| Ex. 16 | 85 | 13.2 | 120 | 17.5 | 60 | 33 | 10 | 90 | 80 |
| Ex. 17 | 85 | 12.8 | 123 | 16.9 | 60 | 32 | 10 | 90 | 85 |
| Comp Ex. 1 | 85 | 12.8 | 122 | 17.0 | 60 | 31 | 10 | 90 | 55 |
| Comp Ex. 2 | 86 | 12.9 | 123 | 17.2 | 61 | 32 | 10 | 90 | 61 |
| Comp Ex. 3 | 86 | 12.9 | 121 | 17.2 | 51 | 30 | 10 | 90 | 66 |
| Comp Ex. 4 | 84 | 12.6 | 120 | 16.8 | 33 | 31 | 10 | 90 | 67 |
| Comp Ex. 5 | 88 | 13.2 | 82 | 17.6 | 56 | 30 | 10 | 90 | 65 |
| Comp Ex. 6 | 87 | 13.1 | 41 | 17.4 | 30 | 33 | 10 | 90 | 66 |
| Comp Ex. 7 | 85 | 12.8 | 2 | 17.0 | 0 | 30 | 10 | 90 | 65 |
| Comp Ex. 8 | 85 | 12.8 | 3 | 17.0 | 0 | 2 | 0 | 100 | 66 |

| | Magnetic layer | | | | Evaluation | | |
|---|---|---|---|---|---|---|---|
| | | | | | Dynamic friction coefficient on head | SNR characteristics | |
| Example No. | Perpendicular Longitudinal orientation (%) | Perpendicular orientation/ Longitudinal orientation | Shape of magnetic powder | Contained element other than ferrite (Fe) | Run 1,000/ Run 5 | S/N ratio | Ranging A,B: Pass |
| Ex. 1 | 35 | 1.86 | Hexagonal patelet | Ba | 1.4 | 1.0 | A |
| Ex. 2 | 31 | 2.13 | Hexagonal patelet | Ba | 1.4 | 1.2 | A |
| Ex. 3 | 29 | 2.45 | Hexagonal patelet | Ba | 1.6 | 1.4 | A |
| Ex. 4 | 25 | 2.80 | Hexagonal patelet | Ba | 1.7 | 1.5 | A |
| Ex. 5 | 30 | 2.20 | Hexagonal patelet | Ba | 1.3 | 0.8 | B |
| Ex. 6 | 29 | 2.31 | Hexagonal patelet | Ba | 1.2 | 0.7 | B |
| Ex. 7 | 34 | 1.91 | Hexagonal patelet | Ba | 1.3 | 1.1 | A |
| Ex. 8 | 32 | 2.06 | Hexagonal patelet | Ba | 1.3 | 1.2 | A |
| Ex. 9 | 31 | 2.13 | Hexagonal patelet | Ba | 1.2 | 1.3 | A |
| Ex. 10 | 30 | 2.27 | Hexagonal patelet | Sr | 1.3 | 1.1 | A |
| Ex. 11 | 31 | 2.10 | Hexagonal patelet | None | 1.2 | 1.2 | A |
| Ex. 12 | 30 | 2.23 | Spherical | Ga | 1.3 | 1.2 | A |
| Ex. 13 | 31 | 2.13 | Cubic | Co | 1.4 | 1.1 | A |
| Ex. 14 | 32 | 2.03 | Hexagonal patelet | Ba | 1.1 | 0.6 | B |
| Ex. 15 | 23 | 3.26 | Hexagonal patelet | Ba | 1.7 | 1.5 | A |
| Ex. 16 | 21 | 3.81 | Hexagonal patelet | Ba | 1.8 | 1.8 | A |
| Ex. 17 | 18 | 4.72 | Hexagonal patelet | Ba | 1.8 | 2.1 | A |
| Comp Ex. 1 | 46 | 1.20 | Hexagonal patelet | Ba | 1.5 | 0.1 | C |
| Comp Ex. 2 | 40 | 1.53 | Hexagonal patelet | Ba | 1.4 | 0.2 | C |
| Comp Ex. 3 | 35 | 1.89 | Hexagonal patelet | Ba | 2.1 | 1.2 | A |
| Comp Ex. 4 | 34 | 1.97 | Hexagonal patelet | Ba | 2.3 | 1.3 | A |
| Comp Ex. 5 | 35 | 1.86 | Hexagonal patelet | Ba | 2.4 | 1.3 | A |
| Comp Ex. 6 | 34 | 1.94 | Hexagonal patelet | Ba | 2.1 | 1.3 | A |
| Comp Ex. 7 | 35 | 1.86 | Hexagonal patelet | Ba | 2.5 | 1.4 | A |
| Comp Ex. 8 | 35 | 1.89 | Hexagonal patelet | Ba | 2.7 | 1.4 | A |

The evaluation of the characteristics of each tape in this Experiment was performed by measuring the dynamic friction coefficient on the head in Run 1,000 relative to the dynamic friction coefficient on the head in Run 5, and determining how much the former dynamic friction coefficient increased relative to the latter dynamic friction coefficient. It is to be noted that a smaller value can better suppress the friction of the tape and is hence better. The measurement of the friction was conducted under a load of 60 gf, over a slide distance 60 mm and at a tape running speed of 10 mm/sec with the contact angle of the tape (tape advancing angle) to a head of the LTO standards being set at 5.6°.

The evaluation of SNR was conducted with a loop tester (manufactured by MicroPhysics, Inc.) by acquiring signals reproduced from the magnetic recording tape of each Example or Comparative Example. The following signal acquisition conditions were adopted: head: GMR head, speed: 2 m/s, signals: single recording frequency (10 MHz), and recording current: optimal recording current. The reproduced signals were acquired by a spectrum analyzer over a span (SPAN) of 0 to 20 MHz (resolution band width=100 kHz, VBW=30 kHz). Next, representing the intensity of the signals acquired in the form of a spectrum by S and integrating froor noize without peaks to determine the noise intensity N, the ratio of the signal intensity S to the noise intensity N was determined as an SNR (signal-to-noise ratio).

The SNR so determined was next converted to a relative value (dB) based on the SNR of Example 1 as a control. Using the SNR (dB) determined as mentioned above, the electromagnetic conversion characteristics were determined to be good or bad. Evaluation was made by ranking values of 0.5 dB or greater to be Pass, determining 0.5 to smaller than 1.0 dB to be Rank B, determining 1.0 dB or greater to be Rank A, and ranking smaller than 0.5 dB to be Fail (Rank C).

In this Experiment 1, it was found that the depth of indentations in a magnetic layer, especially the ratio of the depth of the indentations to the thickness of the magnetic layer is an important factor. In particular, it was found that indentations having a depth equal to 15% or greater based on the thickness of a magnetic layer make a large contribution to the suppression of an increase in friction force and further indentations having a depth equal to 20% or greater based on the thickness of the magnetic layer make a larger contribution to the suppression of an increase in friction force. Especially, it was found that the latter indentations the depths of which are equal to 20% or greater make a significant contribution. It was also found that projections formed on a backing layer for use in transfer are suitably as many as 30 or more if their heights are 60 nm or greater. The number of indentations the depths of which are 15% or greater is preferably 100 or more, more preferably 110 or more, and particularly preferably 120 or more, all per 6,400 $\mu m^2$. Further, the number of indentations the depths of which are 20% or greater is preferably 30 or more, more preferably 55 or more, and particularly preferably 60 or more, all per 6,400 $\mu m^2$.

If the magnetic layers were perpendicularly oriented, specifically in all of Examples 1 to 14 in which the perpendicular orientation was 60% or higher (without demagnetization correction) and the longitudinal orientation was 25% or higher, the increase in the dynamic friction coefficient on the head was successfully suppressed and the evaluation or ranking of SNR characteristics was good (evaluated to be "B" or better).

(Experiment 2)

Using a non-contact optical interferometric roughness meter (manufactured by Ryoka Systems, Inc., product name: VertScan), a measurement experiment was next conducted about the surfaces of magnetic layers. The magnification of an object lens was set at 50 times in the measurements. Tape samples used in the measurements were those of Examples 1, 5 and 8 and Comparative Examples 6, 7 and 8 (two tape samples for different measurement locations, Comparative Examples 8-1 and 8-2).

In this Experiment 2, the surface roughness of each magnetic layer was acquired in terms of Ssk value (skewness) and Sku value (kurtosis). Ssk value is a value that represents the degree of symmetry of height distribution, and Ssk value=0 indicates that the height distribution is vertically symmetrical, Ssk value >0 indicates a surface with many fine peaks, and Ssk value <0 indicates a surface with many fine valleys. Concerning Sku value, on the other hand, Sku value=3 indicates that the height distribution is a normal distribution, Sku value >3 indicates a surface with sharp peaks and valleys, and Sku value <3 indicates a planar surface. Measurement results in this Experiment 2 are presented below in Table 2.

TABLE 2

Experiment on Surfaces of Magnetic Layers by Non-contact Optical Interferometric Roughness Meter

| Experiment No. | Magnification of object lens | Surface ruughness of magnetic layer | |
|---|---|---|---|
| | | Ssk value | Sku value |
| Ex. 1 | 50 | −0.53 | 4.45 |
| | | −0.32 | 4.10 |
| Ex. 5 | 50 | −0.48 | 4.15 |
| | | −0.55 | 4.32 |
| Ex. 8 | 50 | −0.32 | 4.10 |
| | | −0.28 | 4.42 |
| Comp. Ex. 6 | 50 | −0.05 | 3.34 |
| | | 0.02 | 3.34 |
| Comp. Ex. 7 | 50 | 0.01 | 3.08 |
| | | −0.02 | 3.01 |
| Comp. Ex. 8-1 | 50 | 0.38 | 4.16 |
| | | 0.39 | 4.20 |
| Comp. Ex. 8-2 | 50 | 0.09 | 3.30 |
| | | 0.29 | 4.20 |

About Surface of Magnetic Layer

As presented in Table 2, the Ssk values in Examples 1, 5 and 8 are all minus values, successfully verifying a state of many fine valleys. The surface configuration of a magnetic layer with a surface, the Ssk value of which is minus (<0) as mentioned above, can be considered to be a characteristic feature in this technology. In other words, the Ssk value of the surface of a magnetic layer by non-contact optical interferometric roughness measurement may be a minus value in this technology. Such a minus value can be considered to be data indicating that fine valleys have been uniformly formed in the surface of the magnetic layer. In Comparative Examples 6, 7, 8-1 and 8-2, on the other hand, the Ssk values are mostly values on the plus side. It was, therefore, found that the formation of indentations was not good.

If analyzed on the basis of the Sku values, on the other hand, values greater than 4 are presented in Examples 1, 5 and 8. It is, therefore, realized from a comparison with the numerical values in the comparative examples that there were many sharp peaks and valleys on the surfaces. Therefore, the evaluation based on the Sku values can also determine that the state of formation of indentations in each magnetic surface was better in the Examples.

(Experiment 3)

Using an atomic force microscope (abbreviation: AFM, manufactured by Degital Instruments, NanoScope IIIa), the surfaces of magnetic layers were observed under magnification.

Figure 12:
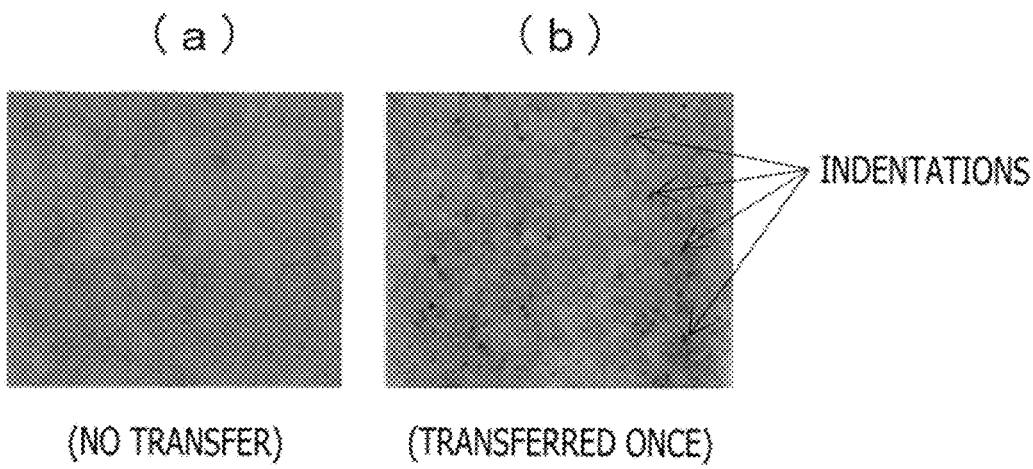
FIG. 12 presents examples of atomic force photomicrographs (drawing substitute photographs) of surfaces of magnetic layers (1), in which the surface in the photomicrograph (a) depicts a case where no transfer is provided while the surface in the photomicrograph (b) depicts a case where transfer is provided once.

FIG. 12 presents drawing substitute photographs, in which the photograph (a) is an atomic force photomicrograph of the surface of a magnetic layer in a case where no transfer step was conducted, and the photograph (b) is an atomic force photomicrograph of the surface of another magnetic layer in a case where a transfer step was conducted. In this Experiment, the transfer step was conducted with projections formed on each backing layer from 80 mass % of small carbon particles of 20 nm average particle size and 20 mass % of large carbon particles of 270 nm average particle size.

From a comparison between these two photographs, it was successfully confirmed that even by conducting a transfer step only once, many indentations are effectively formed in the surface of a magnetic layer and the indentations are formed more widely and evenly in the surface of the magnetic layer (see the photograph of FIG. 12(b)).

In the photograph (b), dark small spots correspond to the indentations. Counting of the number of the indentations in the surface of the magnetic layer subjected once to the transfer gave the following results: 219 indentations with depths of 13 nm and greater, 152 indentations with depths of 15 nm and greater, and 106 indentations with depths of 17 nm and greater (all, per area of 80 µm×80 µm=6,400 µm$^2$). As the thickness of the magnetic layer in the tape used in this Experiment was 85 nm, the depth of 13 nm corresponds to 15.9% based on the thickness of the magnetic layer, the depth of 15 nm corresponds to 17.6% based on the thickness of the magnetic layer, and the depth of 17 nm corresponds to 20% based on the thickness of the magnetic layer.

(Experiment 4)

In the same manner as in the above-described Experiment 1 except for the use of a base layer thinner than the base layer used in Experiment 1, magnetic recording tapes of Examples 2-1 to 2-14 which correspond to Examples 1 to 14, respectively, were prepared. The magnetic recording tapes of Examples 2-1 to 2-14 all had a total thickness of 4.6 µm.

On those magnetic recording tapes, the same evaluation as that described in Experiment 1 was conducted. As a consequence, similar results as in Experiment 1 were obtained. Specifically, the dynamic friction coefficients of the magnetic recording tapes of Examples 2-1 to 2-14 on the head were all low at similar levels as in Examples 1 to 14, and the SNRs of the magnetic recording tapes of Examples 2-1 to 2-14 were all ranked A. It is, therefore, appreciated that the advantageous effects of this technology can be brought about even if a magnetic recording tape has a total thickness of 4.6 µm.

(Experiment 5)

Magnetic recording tapes of Examples 3-1 to 3-9 as presented below in Table 3 were produced. Production methods of those magnetic recording tapes will be described hereinafter.

Example 3-1

A magnetic recording tape was obtained as in Example 1 except that in the orientation step of the magnetic coating formulation, the magnetic flux density of a perpendicularly orienting solenoid was increased and the drying time was adjusted.

Example 3-2

A magnetic recording tape was obtained as in Example 1 except that the magnetic coating formulation was used in a state of dispersion improved owing to an extended dispersion time in a sand mill, and that in the orientation step of the magnetic coating formulation, the magnetic flux density of the perpendicularly orienting solenoid was increased.

Example 3-3

A magnetic tape was obtained as in Example 1 except that the magnetic coating formulation was used in a state of dispersion improved owing to an extended dispersion time in the sand mill, and that in the orientation step of the magnetic coating formulation, the magnetic flux density of the perpendicularly orienting solenoid was increased and the drying time was adjusted.

Example 3-4

A magnetic tape was obtained as in Example 1 except that the powder of hexagonal platelet barium ferrite ($BaFe_{12}O_{19}$) particles was changed from the powder having the particle volume of 1,950 nm$^3$ to a powder having a particle volume of 1,600 nm$^3$.

Example 3-5

A magnetic tape was obtained as in Example 1 except that the powder of hexagonal platelet barium ferrite ($BaFe_{12}O_{19}$) particles was changed from the powder having the particle volume of 1,950 nm$^3$ to a powder having a particle volume of 1,300 nm$^3$.

Example 3-6

A magnetic tape was obtained as in Example 1 except that the average thickness of the magnetic layer was changed from 80 to 60 nm.

Example 3-7

A magnetic tape was obtained as in Example 1 except that the average thickness of the magnetic layer was changed from 80 to 40 nm.

Example 3-8

A magnetic tape was obtained as in Example 1 except that the powder of hexagonal platelet barium ferrite ($BaFe_{12}O_{19}$) particles was changed from the powder having the particle volume of 1,950 nm$^3$ to a powder having a particle volume of 2,800 nm$^3$.

Example 3-9

A magnetic tape was obtained as in Example 1 except that the powder of hexagonal platelet barium ferrite ($BaFe_{12}O_{19}$) particles was changed from the powder having the particle volume of 1,950 nm$^3$ to a powder having a particle volume of 2,500 nm$^3$.

On those magnetic recording tapes, the same evaluation as that described in Experiment 1 was conducted. Evaluation results are presented below in Table 3. As presented in Table 3, similar results as in Experiment 1 were obtained in all the Examples. Specifically, the dynamic friction coefficients of the magnetic recording tapes of Examples 3-1 to 3-9 on the head were all low at similar levels as in Example 1, and the SNRs of the magnetic recording tapes of Examples 3-1 to 3-9 were all ranked A.

Further, as presented in Table 3, it is appreciated that good results are obtained even if the particle volume of the magnetic powder is changed as presented in Table 3. The particle volume of the magnetic powder can be preferably 1,000 nm³ to 3,000 nm³, and more preferably 1,200 nm³ to 2,800 nm³.

TABLE 3

| Example No. | Perpendicular orientation (without demagnetization correction) (%) | Longitudinal orientation (%) | Indentations having depth equal to 20% or greater based on thickness of magnetic layer | | Indentations having depth equal to 15% or greater based on thickness of magnetic layer | | Number of projections of 60 nm or greater height (per 6,400 µm² area) on backing coat layer | Thickness of magnetic layer (nm) | Thickness of non-magnetic underlayer (µm) |
|---|---|---|---|---|---|---|---|---|---|
| | | | Number of indentations (per 6,400 µm² area) | Depth (nm) | Number of indentations (per 6,400 µm² area) | Depth (nm) | | | |
| Ex. 3-1 | 75 | 23 | 61 | 17.4 | 121 | 13.1 | 32 | 87 | 1.1. |
| Ex. 3-2 | 80 | 21 | 60 | 17 | 120 | 12.8 | 33 | 85 | 1.1 |
| Ex. 3-3 | 85 | 18 | 60 | 17 | 123 | 12.8 | 32 | 85 | 1.1 |
| Ex. 3-4 | 65 | 35 | 62 | 17.4 | 120 | 13.1 | 32 | 87 | 1.1 |
| Ex. 3-5 | 65 | 35 | 62 | 17.4 | 120 | 13.1 | 32 | 87 | 1.1 |
| Ex. 3-6 | 75 | 23 | 60 | 12 | 120 | 9.0 | 31 | 60 | 1.1 |
| Ex. 3-7 | 80 | 20 | 62 | 8 | 122 | 6.0 | 31 | 40 | 1.1 |
| Ex. 3-8 | 65 | 35 | 62 | 17.4 | 120 | 13.1 | 32 | 87 | 1.1 |
| Ex. 3-9 | 65 | 35 | 62 | 17.4 | 120 | 13.1 | 32 | 87 | 1.1 |

| Example No. | Shape of magnetic powder/ Contained element other than Fe | Dynamic friction coefficient on head Run 1,000/ Run 5 | SNR characteristics SN ration | SNR characteristics Rank | Particle volume of magnetic powder (nm³) |
|---|---|---|---|---|---|
| Ex. 3-1 | Hexagonal platelet Ba | 1.7 | 1.5 | A | 1950 |
| Ex. 3-2 | Hexagonal platelet Ba | 1.8 | 1.8 | A | 1950 |
| Ex. 3-3 | Hexagonal platelet Ba | 1.8 | 2.1 | A | 1950 |
| Ex. 3-4 | Hexagonal platelet Ba | 1.4 | 1 | A | 1600 |
| Ex. 3-5 | Hexagonal platelet Ba | 1.4 | 1 | A | 1300 |
| Ex. 3-6 | Hexagonal platelet Ba | 1.8 | 2 | A | 1950 |
| Ex. 3-7 | Hexagonal platelet Ba | 1.8 | 2.2 | A | 1950 |
| Ex. 3-8 | Hexagonal platelet Ba | 1.4 | 1 | A | 2800 |
| Ex. 3-9 | Hexagonal platelet Ba | 1.4 | 1 | A | 2500 |

REFERENCE SIGNS LIST

T: Magnetic recording tape
1: Magnetic layer
1a: Surface of magnetic layer
2: Non-magnetic layer (intermediate layer or underlayer)
3: Base film layer
4: Backing layer
5: Tape cartridge
4a: Surface of backing layer
11: Indentation (in magnetic layer)
41: Projection (projecting portion) (on backing layer)
51: Cartridge case
R1, R2: Roll

The invention claimed is:

1. A magnetic recording tape comprising:
a plural-layer structure including at least a magnetic layer, wherein
the tape has a total thickness of 5.6 µm or smaller, and includes a plurality of evenly formed indentations disposed in a surface of the magnetic layer,
wherein the plurality of indentations includes a first plurality of indentations having a depth of 20% or greater and less than 50% of a thickness of the magnetic layer, and a number of the first plurality of indentations is 55 or more per 6,400 µm² of a surface area of the magnetic layer, and
wherein the plurality of indentations includes a second plurality of indentations having a depth of 15% or greater and less than 50% of the thickness of the magnetic layer, and a number of the second plurality of indentations is 100 or more per 6,400 µm² of a surface area of the magnetic layer, and
wherein the depth of the second plurality of indentations is less than the depth of the first plurality of indentations.

2. The magnetic recording tape according to claim 1, wherein
a ratio of an orientation of the magnetic layer in a perpendicular direction to an orientation of the magnetic layer in a longitudinal direction is 2 or greater.

3. The magnetic recording tape according to claim 2, wherein
the number of the second plurality of indentations per 6,400 µm² of the surface area of the magnetic layer is 120 or greater.

4. The magnetic recording tape according to claim 1, wherein
the surface of the magnetic layer has a negative Ssk value as determined by non-contact optical interferometric roughness measurement.

5. The magnetic recording tape according to claim 1, wherein
the tape is configured to run at 4 m/s or faster during recording or reproduction via a magnetic head.

6. The magnetic recording tape according to claim 1, wherein
the plurality of indentations disposed in the magnetic layer as an uppermost layer have been formed by pressing projections, which are formed on a surface of a backing layer disposed as a lowermost layer.

7. The magnetic recording tape according to claim 1, wherein
the tape includes the magnetic layer, a non-magnetic layer, a base film layer and the backing layer in this order from a side where the tape opposes a magnetic recording head during running of the tape.

8. The magnetic recording tape according to claim 1, wherein
the total thickness is 4.6 µm or smaller.

9. The magnetic recording tape according to claim 1, wherein
the magnetic layer is perpendicularly oriented, and has a perpendicular orientation of 65% or higher under condition of no demagnetization correction.

10. The magnetic recording tape according to claim 1, wherein
a depth of the plurality of indentations is 7.8 nm or greater.

11. A magnetic recording tape cartridge having:
a configuration that the magnetic recording tape according to claim 1 is contained in a case in a state with the magnetic recording tape wound on a reel.

12. A manufacturing method of a magnetic recording tape comprising:
a transfer step of, while taking up, on a roll, a magnetic recording tape of a plural-layer structure including at least a magnetic layer and a backing layer, pressing projections, which are formed on a surface of the backing layer, against a surface of the magnetic layer, whereby indentations are formed in the magnetic layer, wherein the magnetic recording tape comprising:
a plural-layer structure including at least a magnetic layer, wherein
the tape has a total thickness of 5.6 µm or smaller, and includes a plurality of evenly formed indentations disposed in a surface of the magnetic layer,
wherein the plurality of indentations includes a first plurality of indentations having a depth of 20% or greater and less than 50% of a thickness of the magnetic layer, and a number of the first plurality of indentations is 55 or more per 6,400 µm² of a surface area of the magnetic layer, and
wherein the plurality of indentations includes a second plurality of indentations having a depth of 15% or greater and less than 50% of the thickness of the magnetic layer, and a number of the second plurality of indentations is 100 or more per 6,400 µm² of a surface area of the magnetic layer, and
wherein the depth of the second plurality of indentations is less than the depth of the first plurality of indentations.

13. The manufacturing method according to claim 12, wherein
the transfer step is further conducted by taking out the tape, which has been taken up once, in an opposite direction and taking up the tape on another roll.

14. The manufacturing method according to claim 12, wherein
the transfer step includes heat treatment to be conducted at a temperature of 55° C. or higher and 75° C. or lower with the projections pressed against the surface of the magnetic layer.

* * * * *